March 31, 1964 G. M. CALVERT ETAL 3,126,672
VERTICAL HONING MACHINE
Filed April 13, 1961 12 Sheets-Sheet 1

INVENTORS:
Glen M. Calvert
Frank J. Jeschke
Charles P. Smith
BY
Wupper, Bradolph & Lord
ATTYS March 31, 1964 — G. M. CALVERT ETAL — 3,126,672
VERTICAL HONING MACHINE
Filed April 13, 1961 — 12 Sheets-Sheet 2

INVENTORS:
Glen M. Calvert
Frank J. Jeschke
Charles P. Smith
By Wuppet, Hradolph & Love Attys March 31, 1964

G. M. CALVERT ETAL 3,126,672

VERTICAL HONING MACHINE

Filed April 13, 1961

INVENTORS:
Glen M. Calvert
Frank J. Jeschke
Charles P. Smith
By
Wupper, Gradolph & Love
Attys

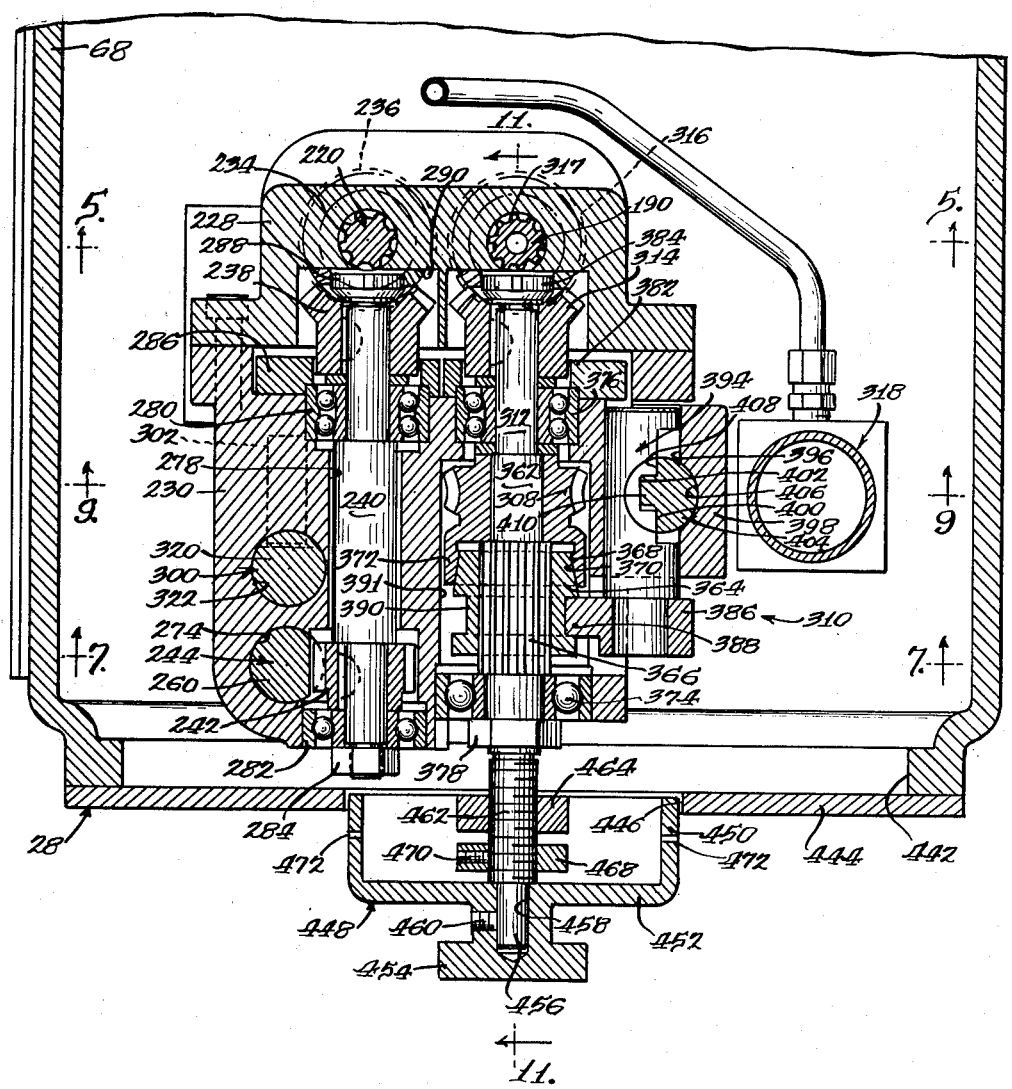

March 31, 1964 G. M. CALVERT ETAL 3,126,672
VERTICAL HONING MACHINE
Filed April 13, 1961 12 Sheets-Sheet 6
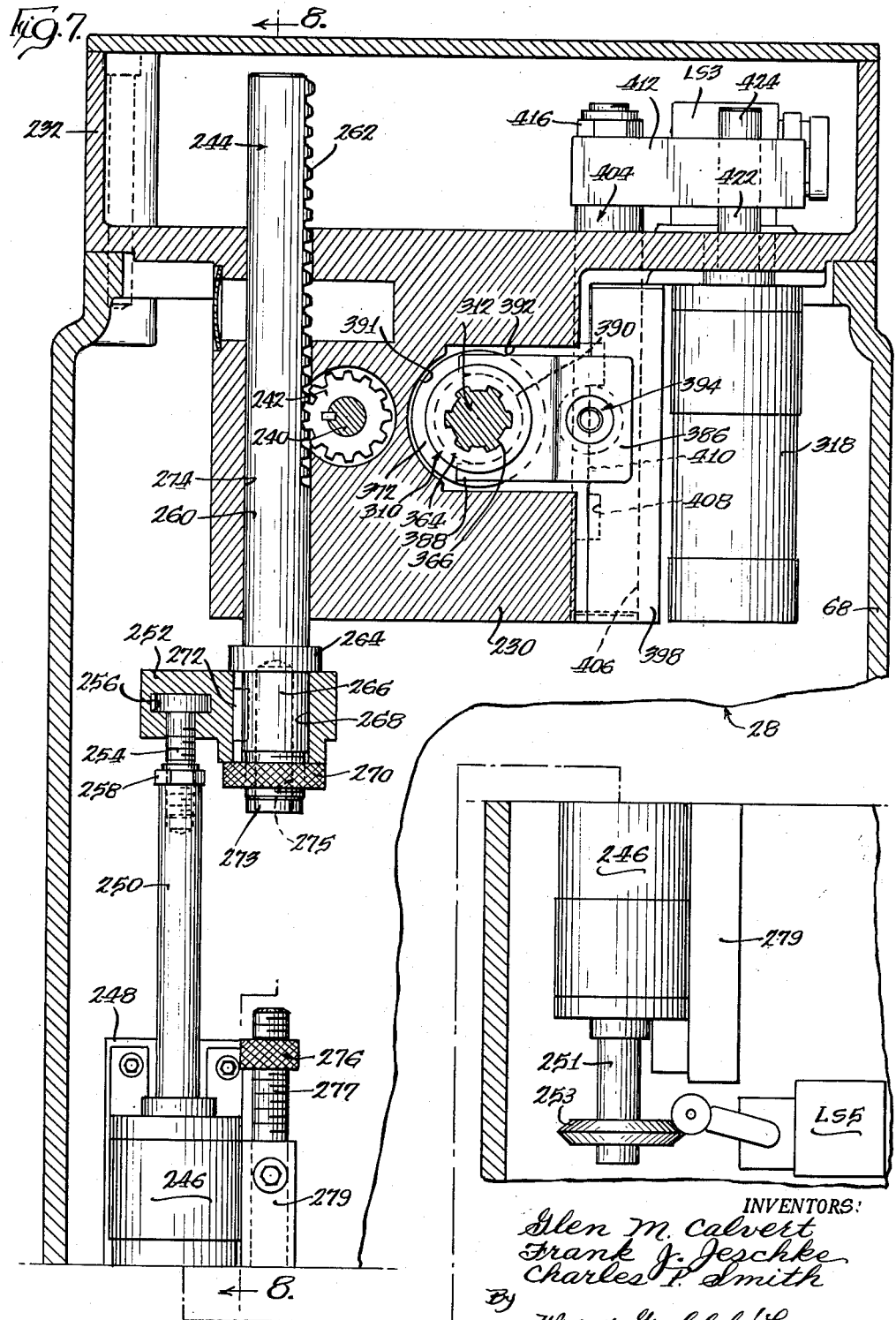
INVENTORS:
Glen M. Calvert
Frank J. Jeschke
Charles P. Smith
By Wupper, Gradolph & Love Attys March 31, 1964
G. M. CALVERT ETAL
3,126,672
VERTICAL HONING MACHINE
Filed April 13, 1961
12 Sheets-Sheet 7
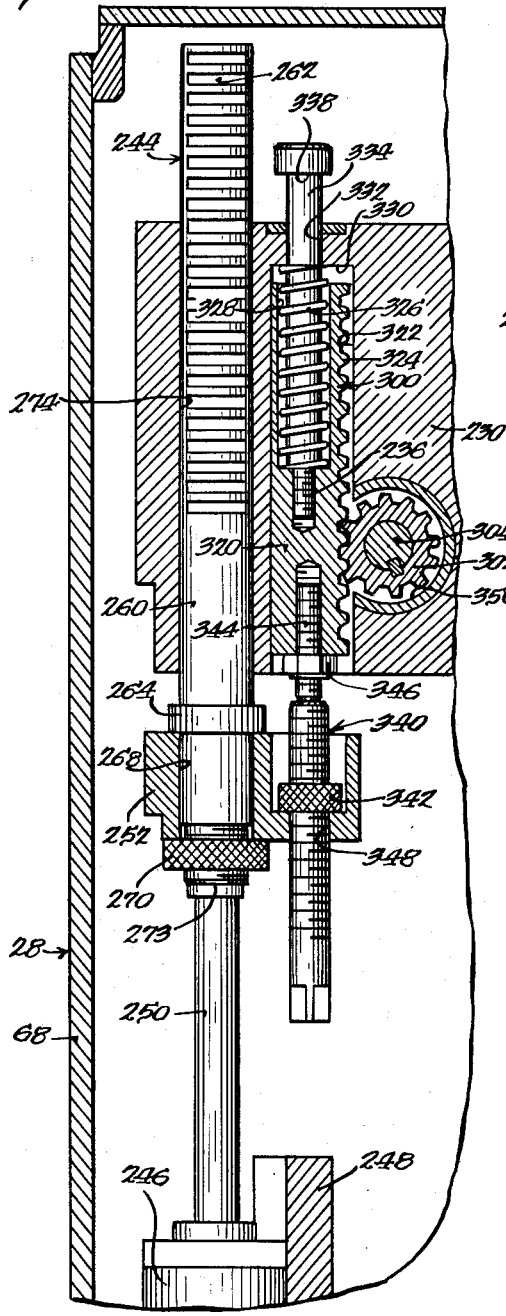
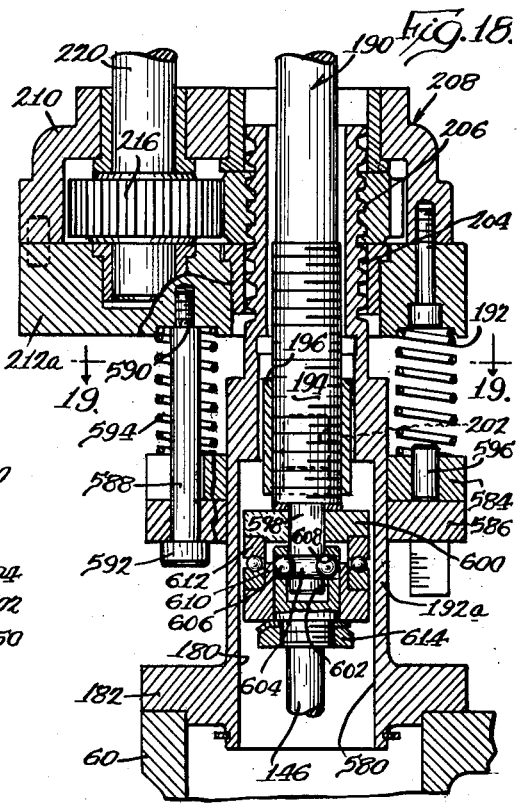
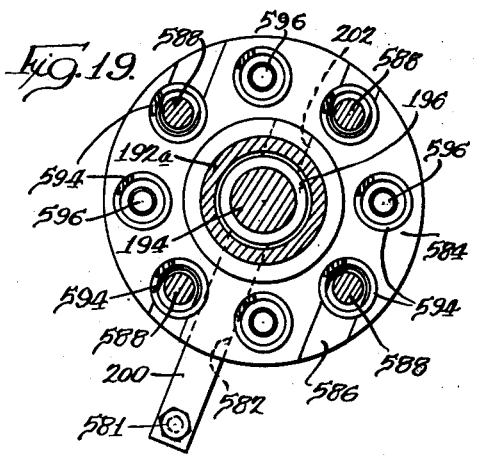
INVENTORS
Glen M. Calvert
Frank J. Jeschke
Charles P. Smith
By
Wupper, Stadolph & Love Attys INVENTORS:
Glen M. Calvert
Frank J. Jeschke
Charles P. Smith

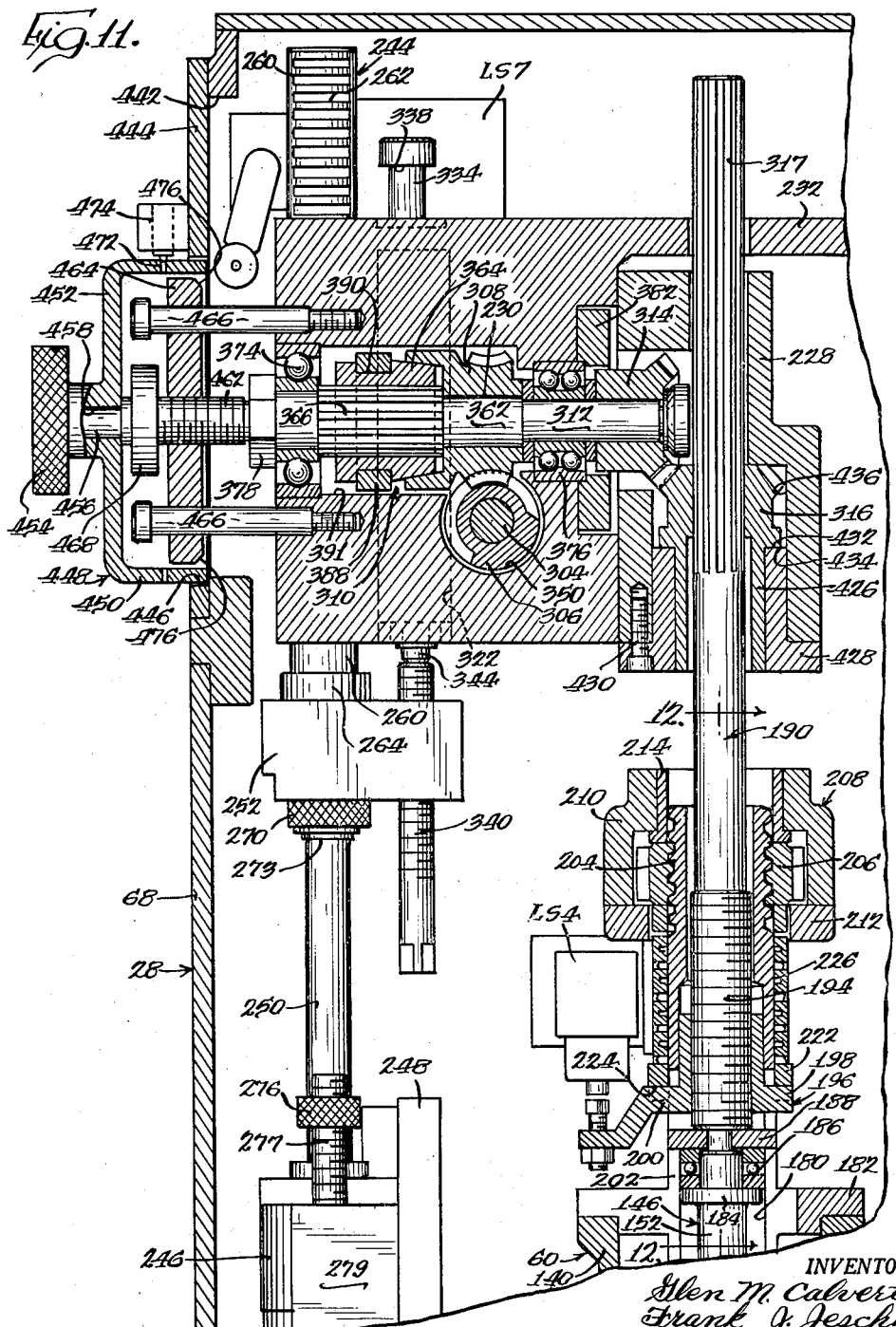

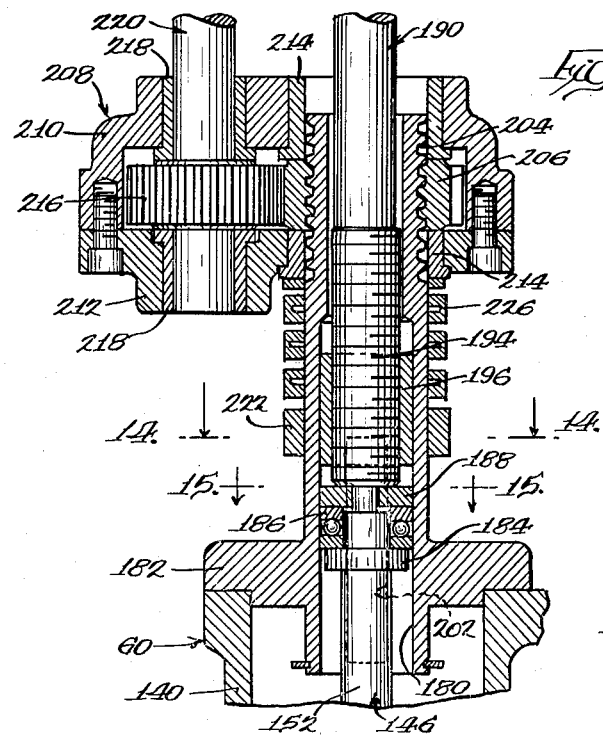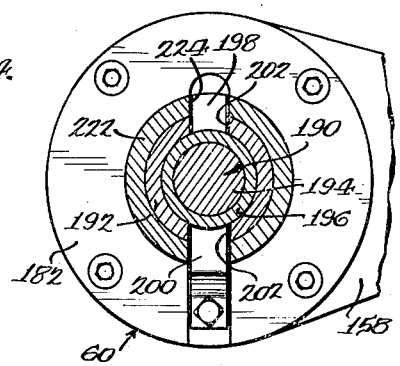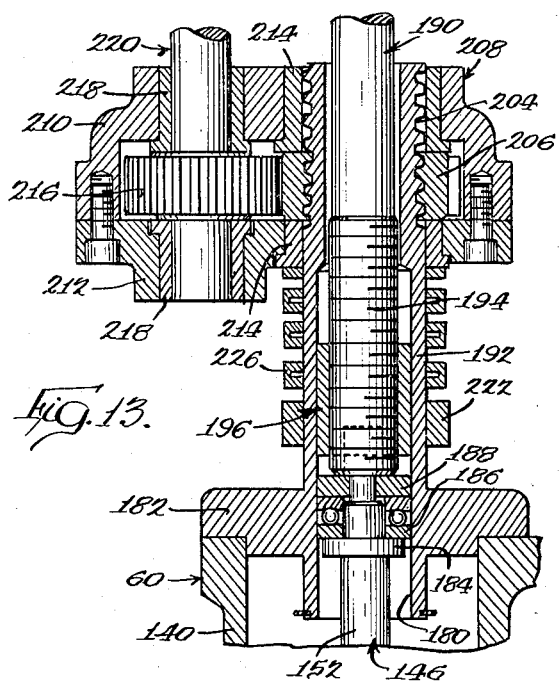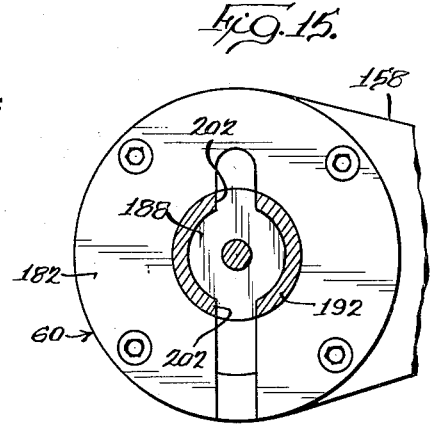

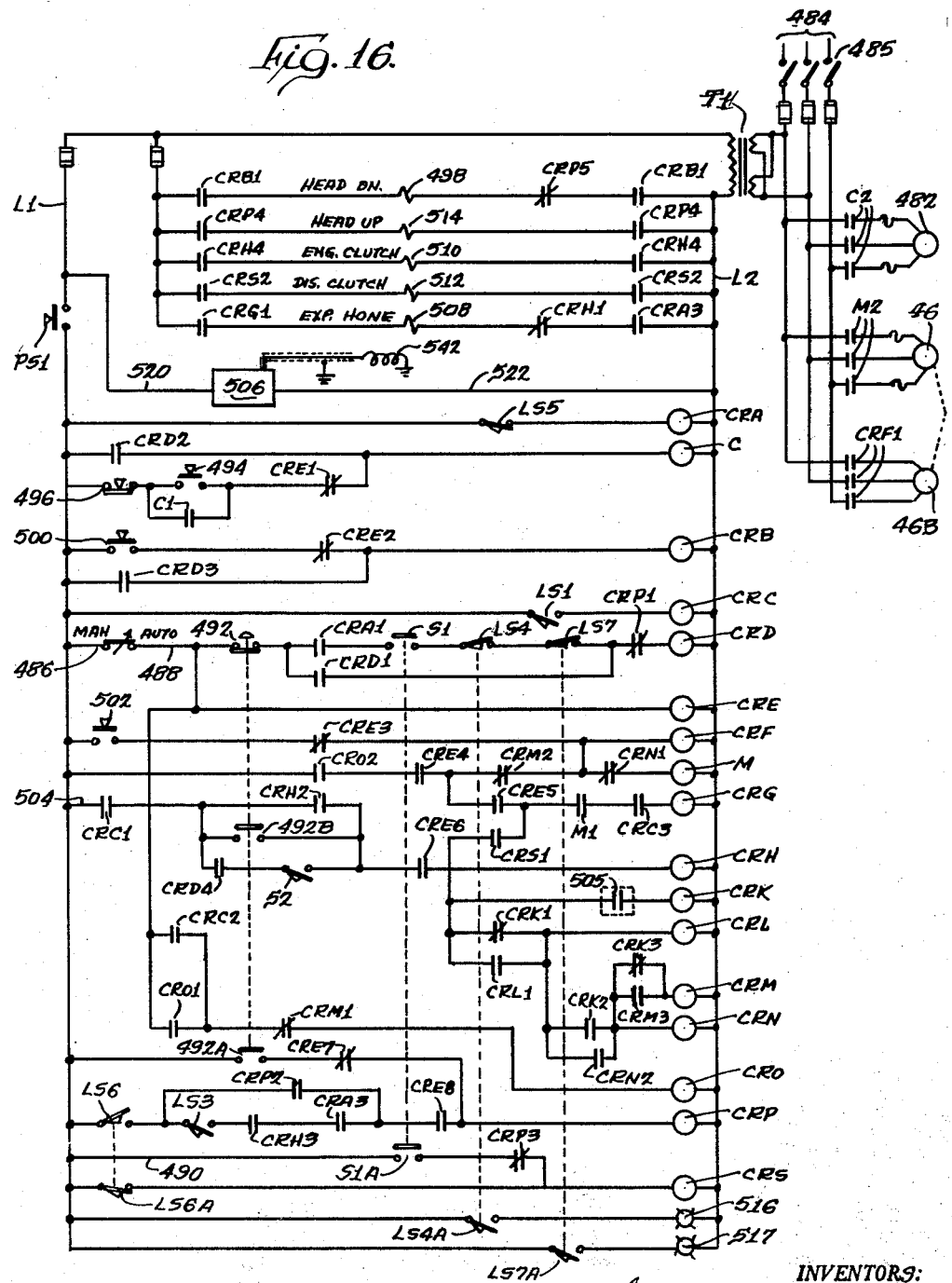

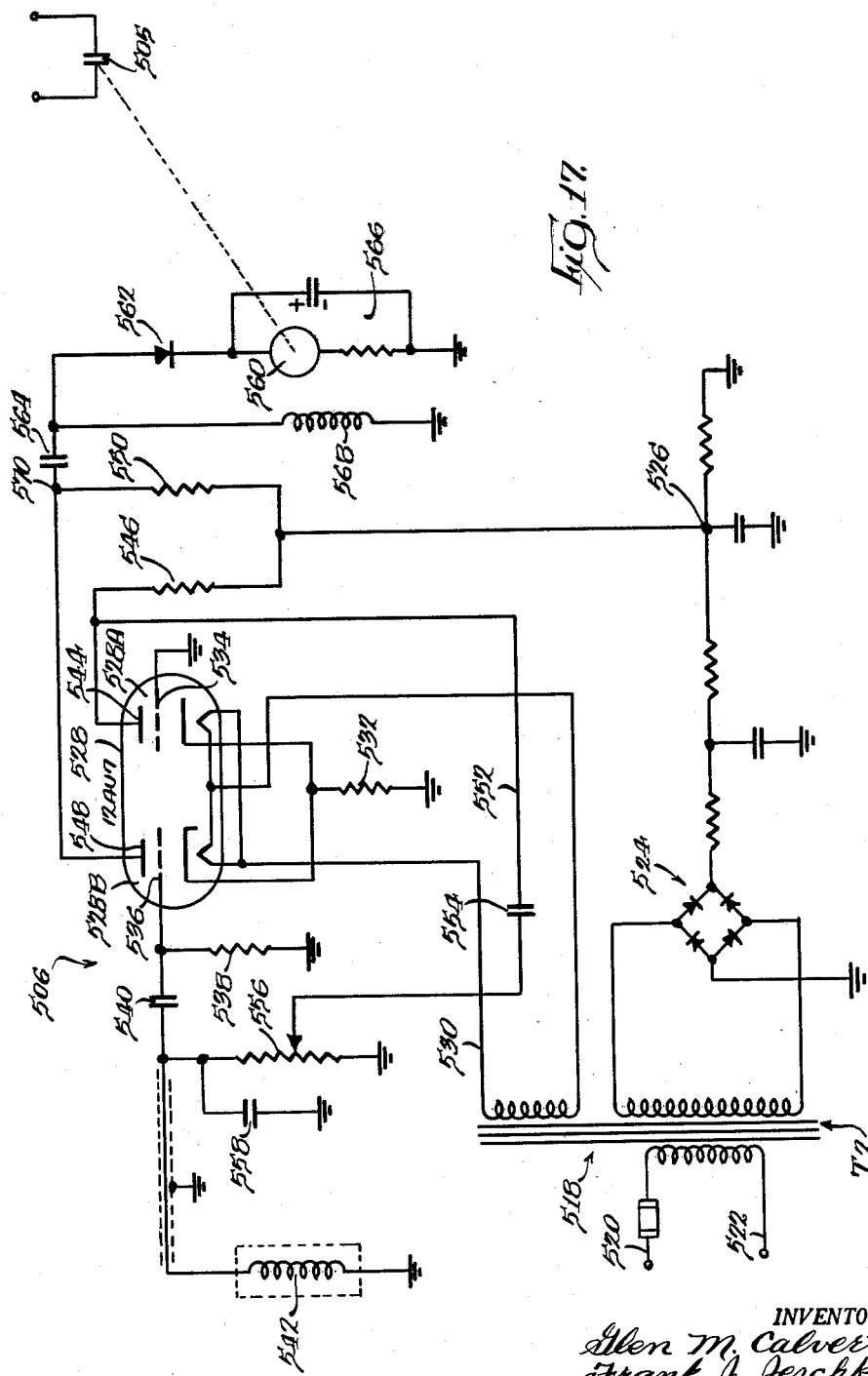

United States Patent Office
3,126,672
Patented Mar. 31, 1964

3,126,672
VERTICAL HONING MACHINE
Glen M. Calvert, Boca Raton, Fla., and Frank J. Jeschke, Detroit, and Charles P. Smith, Grosse Pointe, Mich., assignors to National Automatic Tool Company, Inc., Richmond, Ind., a corporation of Indiana
Filed Apr. 13, 1961, Ser. No. 102,797
17 Claims. (Cl. 51—34)

The present invention relates to honing machines, and in particular to improvements in mechanical honing machines, that is, machines wherein the honing tool is rotated and reciprocated by and from a mechanical power source as distinguished from one which is wholly or partially pneumatic or hydraulic.

Among the objects of this invention are the provision of a new and improved honing machine wherein:

(1) The rotation and reciprocation of the honing tool are accomplished mechanically.

(2) Compensation for wear on the abrasive elements in the honing tool is effected automatically.

(3) Over and under compensation for wear on the abrasive elements can be corrected easily and without dismantling the tool or seriously interrupting machine operation.

(4) The initial adjustment of the honing stones is easily and quickly made and throughout the subsequent honing cycles incremental changes in the adjustment are made to compensate for the wear of the honing stones.

(5) The pressure exerted by the abrasive elements on the surface being honed is carefully controlled, is positive, and is uniform throughout the honing operation regardless of the number of parts being honed.

(6) The rotational speed and reciprocating rate of the honing tool can be readily and positively adjusted within wide ranges.

(7) The machine is capable of being set up as a single spindle, two spindle, or multiple spindle machine for doing various honing jobs.

(8) The machine is fully automatic in its operation including gauging for bore size to terminate the honing operation when the bore has been honed to a predetermined size.

(9) The machine may be readily adapted for incorporation into an automated line for drilling, boring, reaming, etc., parts of various types.

(10) The machine is of simplified construction so that its operation can easily be controlled and varied when necessary.

(11) The mechanism for expanding the honing elements into engagement with the workpiece bore and for exerting honing pressure thereon also compensates for differences in the initial tolerances of the bore at the outset of the honing cycle.

(12) The means for exerting the honing pressure of the stones is capable of being adjusted so that the optimum pressure may be obtained as dictated by the characteristics of the material being honed and the honing stones.

(13) At the end of each honing cycle the honing tool will have its rotation and reciprocation terminated when the tool is withdrawn from the bore which has been honed to a predetermined size.

(14) The machine is provided with adequate safety features and manual overcontrols which can be used when necessary.

Other objects and advantages will become apparent from the following description taken in conjunction with the accompanying drawings, wherein FIG. 1 is a side elevational view of a honing machine incorporating the mechanism of the persent invention;

FIG. 6 is a fragmentary horizontal cross sectional view on an enlarged scale, showing elements of the drive for expanding the honing elements into honing position and for compensating for honing element or stone wear, taken along the line 6—6 of FIG. 5, looking in the direction of the arrows;

FIG. 7 is a vertical sectional view taken along the line 7—7 of FIG. 6, looking in the direction of the arrows, and showing primarily elements of the mechanism for initially expanding the honing elements into honing position, and of the clutch in the mechanism for compensating for stone wear;

FIG. 8 is a vertical sectional view taken along the line 8—8 of FIG. 7, looking in the directional of the arrows, and showing the relationship between the mechanisms for initially expanding the honing elements into honing position and for compensating for wear on the honing elements or stones;

FIG. 11 is a vertical sectional view taken along the line 11—11 of FIG. 6, looking in the direction of the arrows, showing further details of the compensating mechanism drive and showing details of the means for applying a substantially constant expansion pressure on the push rod through which the honing elements are expanded in the honing tool;

FIG. 12 is an enlarged vertical detail cross sectional view, in the plane of FIG. 5, showing elements of the mechanism for initially expanding the honing elements into honing position, of the means for applying the substantially constant pressure on the push rod, and of a portion of the reciprocating mechanism, with all elements in the positions they occupy when the honing elements are retracted;

FIG. 13 is a sectional view similar to FIG. 12, showing the same elements in the positions they occupy when the honing elements have been expanded into honing position;

FIG. 14 is a horizontal cross sectional view taken along the line 14—14 of FIG. 12, looking in the direction of the arrows;

FIG. 15 is a horizontal cross sectional view taken along the line 15—15 of FIG. 12, looking in the direction of the arrows;

FIG. 16 is a simplified diagram of the electrical controls for the honing machine of the present invention;

FIG. 17 is a wiring diagram of the proximity sensing unit forming a portion of the control diagrammed in FIG. 16;

Figure 1:
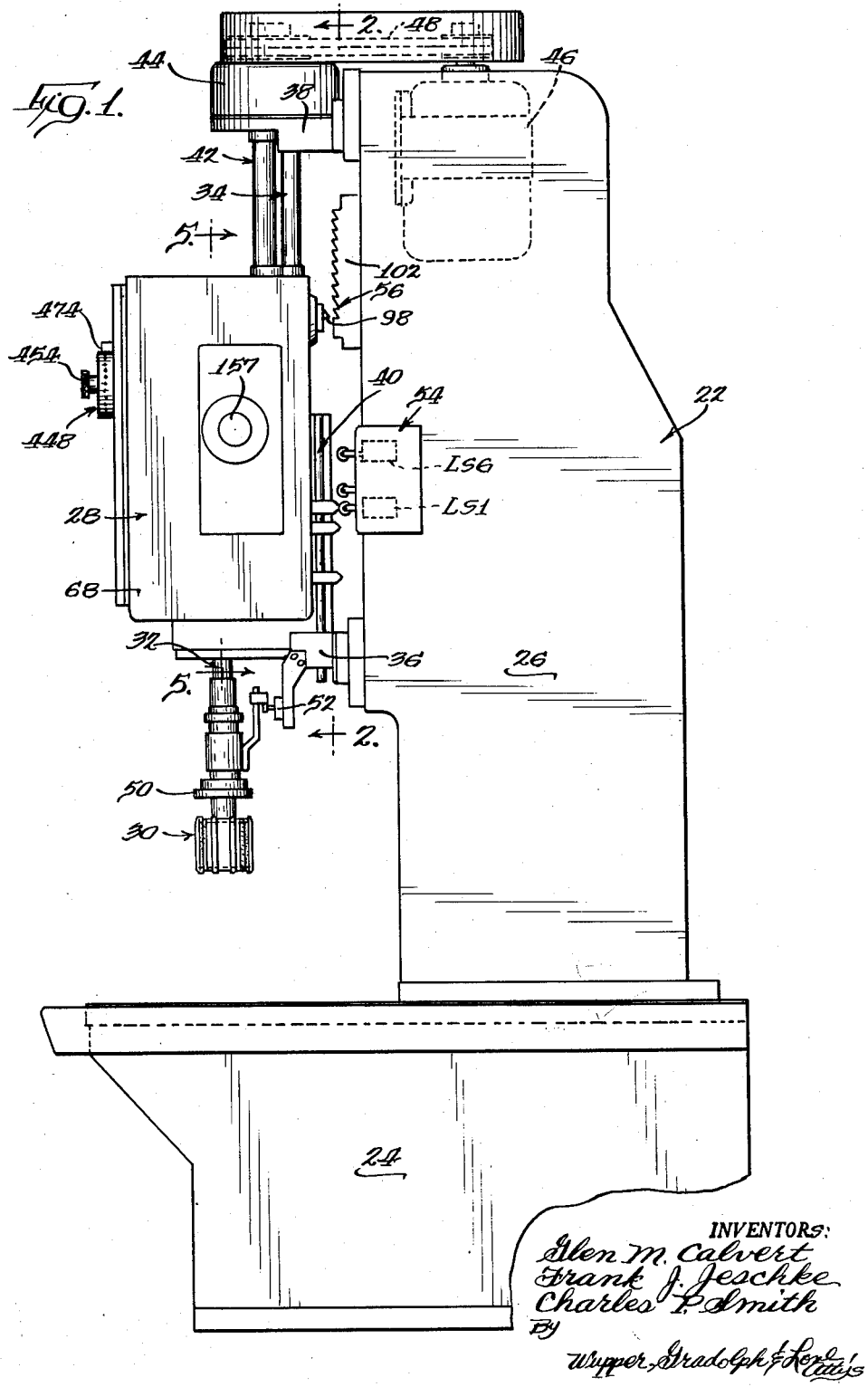

FIG. 18 is a fragmentary vertical cross-sectional view similar to FIG. 12 showing a modified structure of connecting the stone wear compensating mechanism to the push rod in the drive spindle and of placing a constant when exerted, but variably controllable honing pressure when desired, of the honing elements against the surface of the bore being honed; and FIG. 19 is a horizontal sectional view taken along the line 19—19 of FIG. 18, looking in the direction of the arrows.

General Organization and Operation

The honing machine of this invention indicated generally by the reference character 20 includes a frame 22 having a bed or base 24 and a vertical standard 26 mounted thereon and projecting upwardly therefrom at the rear of the base to provide an area at the front of the base for mounting the workpiece and suitable jigs or fixtures (not shown) and to provide a basin for the collection of coolant for return to the coolant tank or sump which may be located in the base 24.

Figure 2:
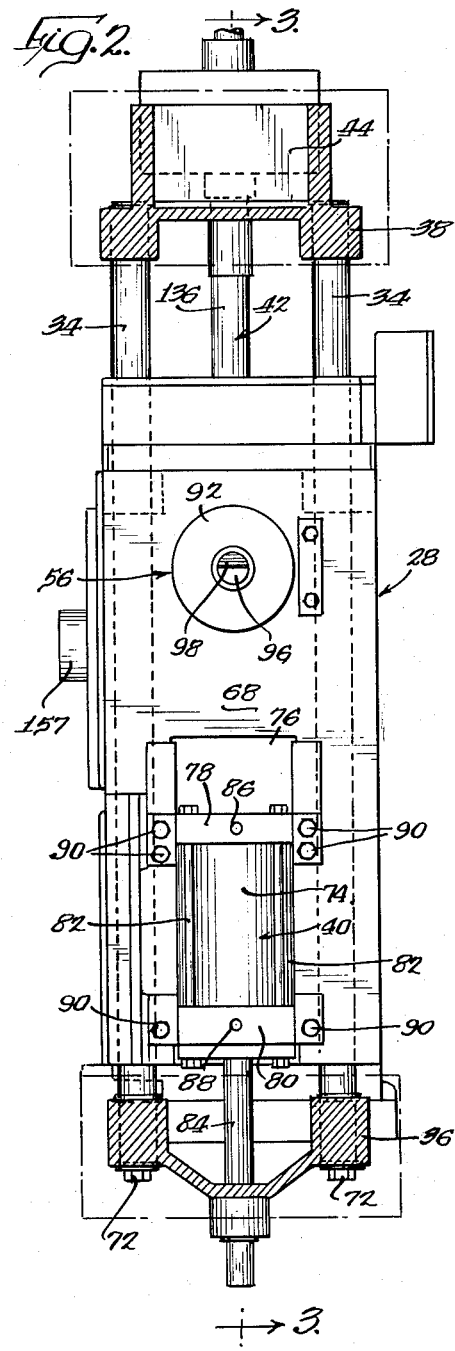
FIG. 2 is a vertical sectional view taken along the line 2—2 of FIG. 1, looking in the direction of the arrows, and showing the structure mounting the head on the machine frame for vertical movement thereon and for safety locking in a predetermined position.
Figure 3:
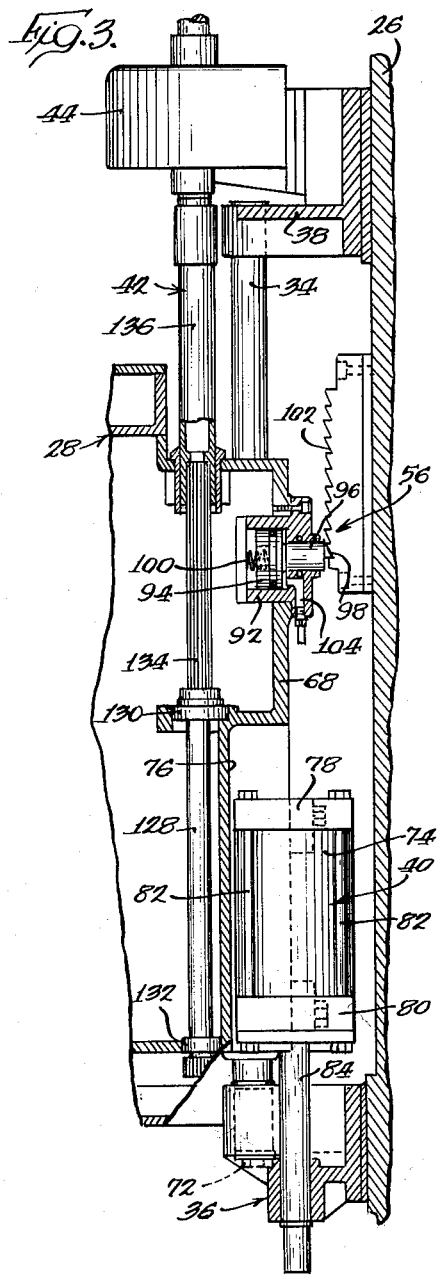
FIG. 3 is a vertical sectional view taken along the line 3—3 of FIG. 2, looking in the direction of the arrows, and showing details of the machine drive and the safety lock for the machine head.

At the forward face of the standard 26 is mounted a machine head 28 carrying the control elements for a honing tool 30 which is mounted at the lower end of a spindle 32 which is rotated and reciprocated by the mechanism contained within the head 28. The head itself is vertically movable upon a pair of rods 34, the lower ends of which are mounted in a yoke or fixture 36 fixed to the forward face of the standard 26, and the upper ends of which are mounted in a similar fixture 38 at the upper end of the standard (FIGS. 1, 2 and 3). The head is reciprocated vertically by a power device 40, and the tool 30 is driven through the mechanism contained in the head 28 by a drive shaft 42 connected through a gear box 44 and suitable pulleys and belts indicated in general by the reference character 48 to a single electric motor 46. This driving mechanism provides all of the power for reciprocating and rotating the honing tool 30 at speeds which may be selected within wide ranges.

The honing tool is of the type which incorporates its own automatic sizing gauge 50 and preferably is of the type disclosed in Glen M. Calvert Patent No. 2,845,752 dated August 5, 1958 for an invention entitled "Sizing Device for Honing Apparatus." When the plug gauge 50 enters the workpiece bore, the bore has been honed to the proper size and a switch 52 mounted on the bracket 36 is tripped to initiate termination of the honing cycle.

As noted previously, the head 28 is moved vertically and its position is under the control of a group of limit switches indicated by the reference character 54 and it is equipped with a safety latching means 56, automatically operable in the event of the failure in the pneumatic system, to prevent the unwanted drop of the head 28 toward the work which could result in damage to the honing tool 30, the work, and the jigs and fixtures.

Figure 4:
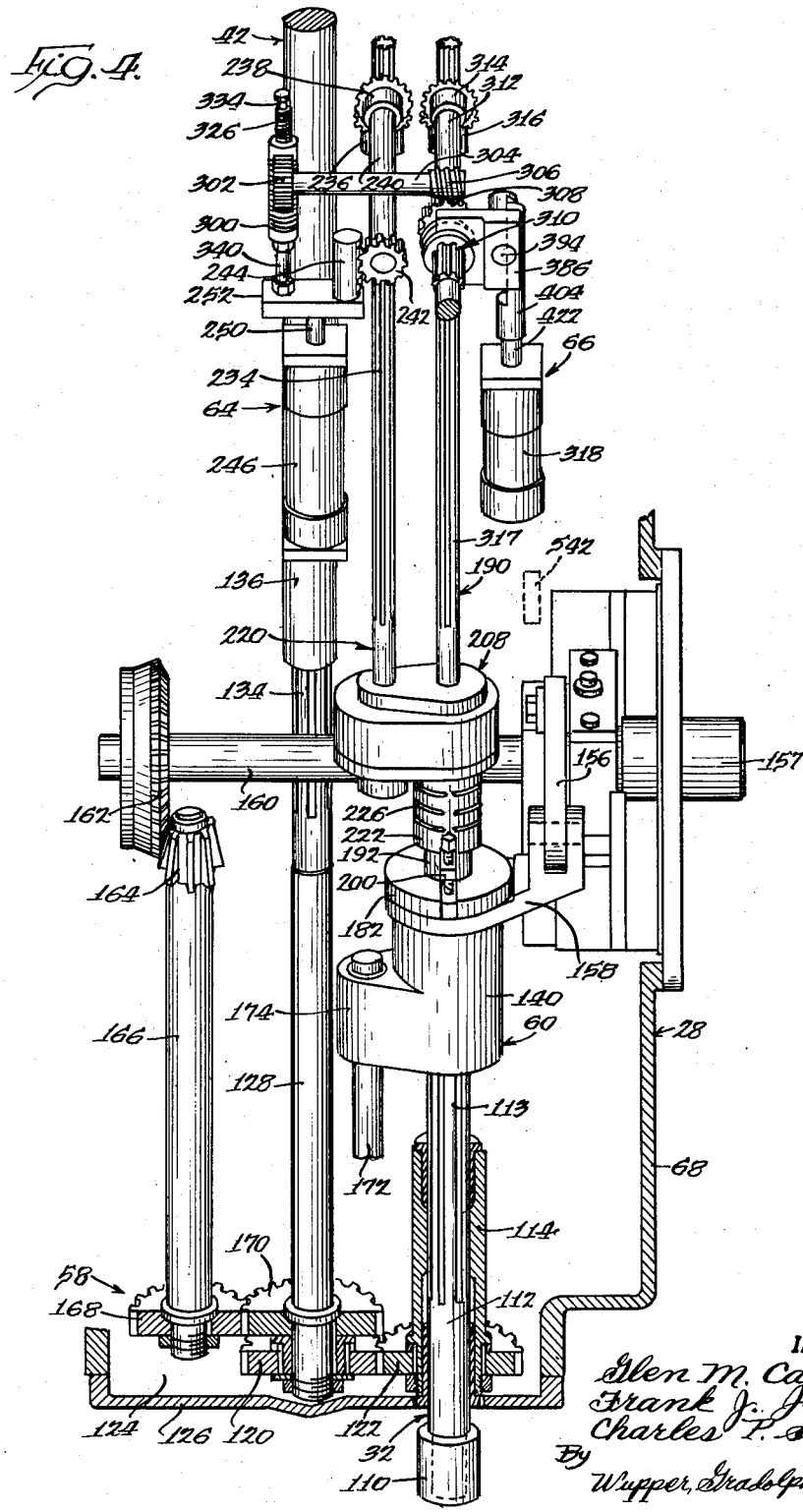
FIG. 4 is a simplified and somewhat diagrammatic perspective view, partially broken into section, of the mechanism for expanding the honing elements into honing position, for compensating for honing element or stone wear, and for rotating and reciprocating or stroking the honing tool.

Referring primarily to FIG. 4, it is seen that the drive shaft 42 drives a set of pickoff gears 58 and through suitable mechanism a reciprocating head 60 which is connected to the spindle 32 and the spindle 32 itself for rotation thereof.

Also included within the head 28 is a mechanism 64 for initially expanding the honing elements into contact with the bore of the workpiece and a mechanism 66 for compensating for stone wear, the latter being operated on each honing cycle.

In order to facilitate the understanding of the specific details of the machine of this invention, a brief description of a single honing cycle will be given with reference to the general organization.

When the work is properly positioned in a jig or fixture below the honing tool 30, the start switch is operated, and the pneumatic power device 40 is energized to move the head 28 to its lowermost position. The flow of coolant is started and the motor 46 is energized to drive the honing tool 30 in a rotational and reciprocated fashion within the bore of the work. At the outset of the honing operation the stone expanding mechanism 64 is operated to expand the honing stones into contact with the workpiece bore, and by a mechanism which will be set forth in detail hereinafter the pressure of these stones is regulated so as to be constant throughout the honing operation. The honing action is continued until the plug gauge 50 enters the bore being honed to operate the switch 52 to initiate termination of the honing operation as more fully explained in the above mentioned Patent No. 2,845,752.

The machine, following the operation of the switch 52, continues stroking and reciprocating the tool 30 until the tool is withdraw and the expansion mechanism 64 is operated to permit collapse of the honing elements within the bore. At the same time, however, the stone wear compensation mechanism 66 is operated to adjust by an incremental amount the expansion of the stones for the next honing cycle to compensate for the wear which had been imparted to the stones during the immediately previous cycle.

During the withdrawal of the honing tool 30, the machine head 28 is moved upwardly by the pneumatic device 40 to an intermediate position, that is one wherein the tool 30 clears the workpiece and permits the insertion of another workpiece into honing position. When the tool 30 has been withdrawn, the coolant is shut off and the reciprocation and rotational action is terminated. The machine is in condition for the removal of the honed part and the positioning of the next part to be honed, and for another honing cycle to take place.

Machine Head

As stated previously, the vertically movably mounted machine head 28 includes a boxlike casing 68 having suitable openings fitted with closure plates for access to its interior and the drive elements contained therein. It houses the honing tool drives for rotation and reciprocation or stroking of the honing tool 30, the mechanism 64 for initially expanding the stones into contact with the workpiece bore, the mechanism 66 for automatically compensating for stone wear, and the control for terminating the honing operation.

The casing 68 is slidably mounted on a pair of rods 34 which extend through suitable bushings in bosses 70 at the rear of the casing at the upper and lower portions thereof. The rods 34 have their lower ends anchored in a yokelike mount 36 by means of nuts 72 at the lower projecting ends thereof. The upper ends of the rods 34 are held in the top bracket 38, and the brackets 36 and 38 are suitably immovably secured to the standard 26.

The head 28 has three positions on the standard 26. The first is its uppermost or fully retracted position in which it would be held when the machine is not in use, when the honing tool 30 is being changed, when the pickoff gears 58 are being changed to change the driving ratio, or when the machine is being serviced. The second position is its lowermost (FIG. 1) in which the honing tool is in the workpiece bore, and in which the honing operation is carried out. The third is the intermediate or "normal" retracted position in which the honing tool 30 is removed from the workpiece bore and fixture to provide sufficient room for changing of the workpiece. The head 28 is moved to and normally held in these positions by the pneumatic power device 40.

The pneumatic power device 40 comprises an air cylinder 74 located in an external pocket or recess 76 in the rear face of the casing 68 (FIGS. 2 and 3). The cylinder 74 is carried on an upper bracket 78 and a lower bracket 80 which are interconnected by tie rods 82 and are secured to the housing casing 68 at the sides of the recess by bolts 90. The cylinder 40 is fitted with a piston (not shown) which is connected to a piston rod 84 projecting from the lower end of the cylinder and fixed in the bracket 36 so as to be immovable relative thereto. Thus, the piston rod 84 and associated piston are fixed with respect to the standard 26 and the cylinder 74 is movable. The bracket 78 is provided with an air inlet 86 which is connected to a suitable source of air under pressure so that air may be pumped into the upper end of the cylinder on top of the piston, thereby to raise the head 28 on the standard 26. A second air port 88 for the lower end of the cylinder is provided in the bracket 80 which may be connected to an air flow control so that when the air is exhausted its flow rate will be regulated, thereby controlling the speed with which the head 28 may be moved.

An automatic safety latch 56 is provided to support the head 28 against any unwanted downward movement in the event of failure in the pneumatic system. The safety latch includes a cylinder 92 mounted at the rear of the casing 68 and having a piston 94 slidable therein. A piston rod 96 connected to the piston 94 projects from the cylinder and has a toothlike dog 98 formed on its outer end. The piston 94 and piston rod 96 are biased outwardly to project the dog outwardly of the housing by a spring 100 acting between the head of the piston and the head of the cylinder 92. When projected outwardly, the tooth 98 is adapted to engage in one of the teeth of a rack 102 which is mounted on the face of the standard 26. When the machine is functioning normally, air under pressure enters the rod end of the cylinder through the port 104 connected to the pneumatic system to compress the spring 100 and hold the dog 98 out of engagement with the rack 102. Normally the honing operation is relatively short, and the head 28 will be held in honing position by the air in the cylinder 74. However, should the air pressure be low, or a sudden leak or other malfunction develop in the system, the spring 100 will immediately sense the drop in air pressure and engage the dog 98 with one of the teeth of the rack 102 to support the head 28. This condition also obtains when the machine is at rest and is shut down.

*Honing Tool and Drive*

A honing tool 30 is of the type which carries in its head a plurality of honing elements which are moved between retracted and expanded position in a well known manner by camming means operated by a push rod or similar mechanism in the tool. The elements are expanded against resilient means which frequently takes the form of garter springs engaging the honing elements themselves. In the small size tools the honing elements may not be positively retracted due to the limited space.

Figure 5:
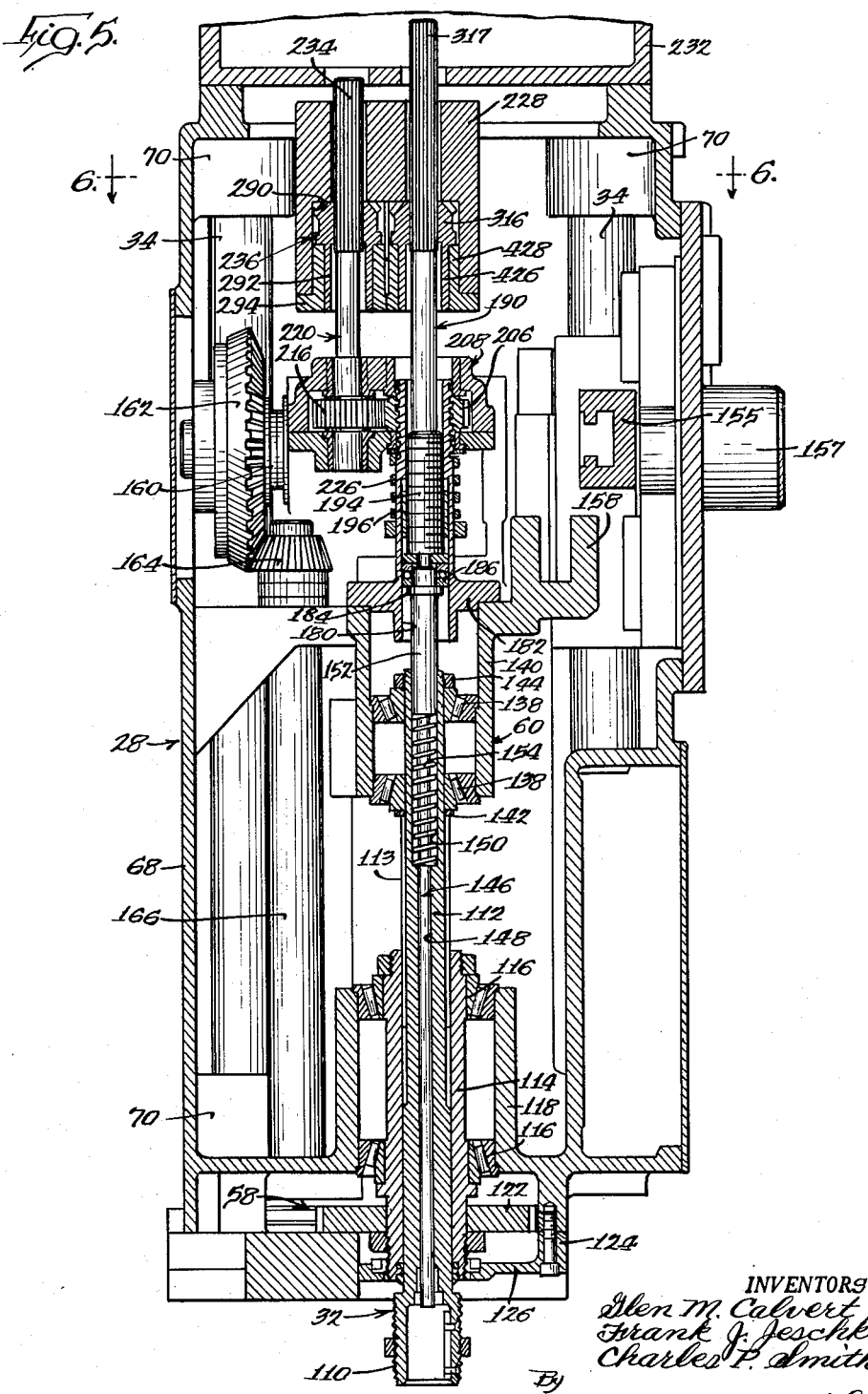
FIG. 5 is a vertical cross sectional view through the machine head housing showing many of the elements of FIG. 2, and is taken along the line 5—5 of FIGS. 1 and 6, looking in the direction of the arrows.

As will be appreciated from the previously mentioned Calvert patent, the honing tool includes, in addition to the head, an appropriate spindle, gauge, and other operating elements with which the present invention is not concerned. It has a coupling member which is adapted to be connected to a coupler 110 on the lower end of the drive spindle 32 (FIGS. 4 and 5). The drive spindle 32 is a long tube 112 splined at 113 and is slidable within another tubular spindle 114 carried in thrust bearings 116 in a bearing cage 118 forming part of the gear casing 68.

The driving tube 114 is, therefore, fixed against reciprocation while the drive spindle tube 112 is rotatable and reciprocable in the casing 68.

The driving tube 114 is connected to and driven from the main drive shaft 42 by a pair of pickoff gears 120 and 122. Pickoff gear 120 is keyed to the lower end of the drive shaft 42 and is meshed with the gear 122 which is mounted on and keyed to the lower end of the driving tube 114. Both of these are housed within a gear case 124 formed at the lower end of the casing 68 and finished by a removable gear case cover 126 so that the pickoff gears can be changed to provide a change in the driving ratio, and thus a variation in the rotational speed of the honing spindle 32. By this arrangement, the rotational speed of the honing tool may be varied from 200 r.p.m. to 800 r.p.m., for example.

The drive shaft 42 is in two sections (FIG. 3). The lower section 128 is mounted in the casing 68 on bearings 130 and 132, and above the bearing 132 has a splined section 134 over which telescope upper section 136 of the drive shaft. The upper section 136 is connected to the gear box 44 above the head 28 and receives its driving impetus from the motor 46 in the manner previously described.

The spindle tube 112 is rotatably mounted on a pair of axially spaced thrust bearings 138 fixed in a tubular bearing cage 140 forming a part of the reciprocating head 60 (FIG. 5), the spindle tube 112 being retained between a washer 142 and a nut 144. Thus, as the head 60 is reciprocated in a manner to be described hereinafter, the spindle tube 112 is similarly reciprocated on its splined connection with the driving tube 114 at the same time it is rotated in the manner previously described.

The spindle tube 112 carries a push row 146 slidable in a bore 148 which communicates with a counterbore 150 at the upper end. The push row 146 is adapted to be moved downwardly of the spindle tube 112 and cooperates with the push rod in the honing tool 30 to expand the honing elements into honing position. The push rod has an enlarged upper portion 152 which is slidable in the counterbore 150 and projects above the upper end of the spindle tube 112 to coact with the stone expansion mechanism 64 and stone wear compensation mechanism 66. A spring 154, confined between the shoulders at the juncture between the bore 148 and counterbore 150, and main portion of the push rod 146 and its upper enlarged portion 152, biases the push rod upwardly and in contact with the stone expansion mechanism 64. The spring need only be strong enough to lift the push rod 146 out of stone expanding position at the end of a honing cycle.

It may be desirable, particularly when the lift on the honing tool camming elements is low, is below 6° for example, positively to withdraw the push row 146, and such structure will be described hereinafter.

The head 60 and spindle 32 are reciprocated vertically by means of a crank 155 which drives a connecting rod 156 (FIG. 4) which is pivotally connected to an arm 158 extending laterally from the upper end of the bearing cage 140. The crank is driven by a transverse shaft 160 suitably journaled in the casing 68 and having a large bevel gear 162 fixed thereto at its end opposite the crank. The bevel gear meshes with a smaller bevel gear 164 fixed to the upper end of a countershaft 166 driven by the pickoff gears 58. The countershaft 166 is similarly suitably journaled in the casing 68, and its lower end projects into the gear case 124. At its lower end it has a pickoff gear 168 keyed thereto which is meshed with a pickoff gear 170 keyed to the lower end of the drive shaft 42. The gears 168 and 170 may be removed from their shafts and changed in order to change the gear ratio in the same manner as the pickoff gears 120 and 122.

The reciprocating head 60 is guided against lateral displacement by a guide rod 172 which slidably extends through a boss 174 formed on one side of the bearing cage 140, the guide rod 172 being fixed against movement in the housing 68.

The reciprocation rate or stroking rate of the head 60 can be varied as noted by changing the driving ratio of the pickoff gears 168 and 170 so that the variation can range in the area between 68 and 187 strokes per minute, for example. The length of the stroke may be varied by an adjustment in the connecting rod mechanism 156 from the adjustment knob 157 connected thereto. If desired, the reciprocation for the head 60 can be effected by a mechanism such as that shown in Floyd A. Swanson application Serial No. 740,445, filed June 6, 1958, now Patent No. 3,025,642, issued March 20, 1962, for an invention entitled "Honing Apparatus," and in Floyd A.

Swanson application Serial No. 766,592, filed October 10, 1958, now Patent No. 3,013,363, issued December 19, 1961, for an invention entitled "Honing Apparatus."

Initial Feedout of Honing Stones

The honing tool 30 is of the type which incorporates a push rod which as previously explained is actuated from the push rod 146 slidable in the spindle tube 112. The push rod is normally held in retracted position by the spring 154, but when it is urged outwardly by the stone expansion mechanism 64, it acts to expand the stones in the tool head into engagement with the workpiece bore.

The enlarged upper end 152 of the push rod 146 which projects upwardly of the spindle tube 112, extends into a long bore 180 in cap 182, closing the upper end of the bearing cage 140 and which is bolted thereto (FIGS. 5, and 11 to 15). The push rod section 152 has a flange 184 thereon which supports a thrust bearing 186 acting against a thrust block 188 which is slidable in the bore 180. The thrust block 188 bears against the lower end of a stone compensation push rod 190 which will be described presently.

The bore 180 extends through a generally tubular extension 192 formed on the upper side of the cap 182 and projecting appreciably upwardly. It is into this bore and the extension 192 that the stone compensation push rod 190 extends. The push rod 190 has a relatively long threaded portion 194 at its lower end which is screwed into a stone compensating feed nut 196. The feed nut 196 is nonrotatably slidable in the bore 180 and has a pair of arms 198 and 200 projecting through longitudinally extending diametrically opposed slots 202 in the tubular extension 192 and the cap 182. Thus, even though the stone compensation push rod 190 be rotated, the nut 196 will not turn and its axial position relative thereto can be changed in a manner which will presently be described.

At its upper end the tubular extension 192 has formed thereon a rather coarse external threaded section 204 which is in constant mesh with a gear 206 enclosed within a feed actuating gear housing 208 which is composed of an upper section 210 and a lower cap 212. The gear 206 is confined between a pair of bushings 214 in the gear housing 208 and is provided with external gear teeth which mesh with the similarly formed teeth of a driving gear 216 similarly enclosed within the housing 208 between a pair of bushings 218. The driving gear 216 is keyed to a stone expansion drive shaft 220 which is journaled in the bushings 218 and extends upwardly from the gear housing 208.

A thrust washer 222 overlies the laterally projecting arms 198 and 200 of the stone compensation feed nut 196 and is notched at 224 to be nonrotatable thereon. The thrust washer closely encircles the tubular extension 192, and between it and the lower cap of the housing 208 is confined a stone expansion pressure spring 226 which similarly encircles the tubular extension 192. The spring is of the type which exerts a substantially constant force over the full extent of its compression so that when the honing stones are expanded into contact with the bore of the workpiece, a predetermined, substantially constant pressure is exerted by them against the bore surface. As the honing operation proceeds, this pressure remains constant so that at the end of the honing operation the pressure exerted by the stones is the same as it was initially. A modification of this arrangement permitting adjustment of the honing stone pressure will be described hereinafter.

When the shaft 220 is rotated in the stone expansion direction, it drives the gear 216 and the gear 206 which screws the gear housing down onto the tubular extension 192 from the position shown in FIG. 12 to that shown in FIG. 13, thereby moving the stone compensation push rod 190 and the nut 196 downwardly in the bore 180, and consequently the push rod 146 downwardly in the spindle tube 112 to exert an expanding pressure on the push rod contained or included within the honing tool 30, thereby to move the stones into contact with the workpiece bore.

The drive shaft 220 for the stone expansion extends upwardly in the casing 68 and into cap 228 for a bearing block 230 formed as an integral part of the head 232 of the casing 68. The cap 228 is suitably secured, for example, by bolts to the bearing block 230. Referring most particularly to FIG. 4, it will be noted that the upper end of the shaft 220 is splined at 234 and is driven by a bevel gear 236 which is held against axial movement. The bevel gear 236 is in constant mesh with a second bevel gear 238 which is keyed to a shaft 240 at one end thereof. A spur gear or pinion 242 is mounted on the opposite end of the shaft 240 and is in mesh with a rack 244. The rack 244 is driven from a double acting pneumatic cylinder-piston combination 246. At the time the head of the honing tool 30 enters the bore of the workpiece, a control is actuated which admits air to operate the pneumatic cylinder-piston 246. This in turn causes the rack 244 to be moved downwardly as seen in FIGS. 4, 5, and 7, thereby driving the pinion 242, shaft 240, and bevel gear 238. The bevel gear 238 meshed with the bevel gear 236 drives the shaft 220 to operate the mechanism previously described to move the gear housing 208 from the position of FIG. 12 to that of FIG. 13, wherein the push rod 146 acts on the push rod in the honing tool 30 and expands the stones into engagement with the work.

The cylinder 246 is mounted on a wall 248 (FIGS. 7 and 11) which is a part of the casing 68. It has projecting upwardly therefrom a piston rod 250, which within the cylinder is connected to a double acting piston and at its upper end it is connected to a yoke 252. A stud 254 is adjustably threaded into the rod 250, and its head is held in a T-shaped slot 256 in the yoke 252. A lock nut 258 insures that the adjustment will not be inadvertently disturbed. By means of the stud 254 and the rod 250, the position of the stroke (but not its length) of the rack 244 can be adjusted.

The rack 244 is an elongated cylindrical rod 260 having rack teeth 262 formed at one side thereof. Adjacent its lower end the rod 260 has a flange 264 and an extending portion 266 inserted into a bore 268 in the yoke 252. At its outer end the extension 266 is threaded to receive a lock nut 270. A key 272 prevents rotation between the rack 244 and the yoke 252. The rack reciprocates in a bore 274 formed in the bearing block 230 and in doing so the rack teeth 262 which are in mesh with the teeth of the pinion 242 drive the latter in either direction, depending upon whether the rack is being moved downwardly or upwardly in the various figures in which it is shown.

The stone expansion stroke of the rack is limited by an adjustable stop nut or ring 276 which is threaded onto a stud formed on or carried by a stop block 279 bolted to the wall 248 (FIG. 7). As the rack is moved downwardly the end of the stud 277 above the stop ring 276 enters a bore 275 drilled into the rack cylinder 260 from the lower end thereof to permit the bottom 273 of the rack 244 to contact the stop ring 276 and to terminate its motion in the honing stone expansion direction. This control is necessary to permit the honing machine to have extreme flexibility in using very small honing heads where the stones are not moved a very great distance to bring them into contact with the bore of the workpiece. On the other hand, with relatively large bores and correspondingly larger honing tools, it is frequently necessary to move the stones appreciably outwardly during the honing operation and a longer rack stroke is dictated.

The shaft 240 as seen most clearly in FIG. 6 is mounted in a slightly oversize bore 278 in the bearing block 230 and is carried on ballbearings 280 and 282 at the inner and outer ends respectively, the ballbearings supporting the shaft for rotation in the bearing block and also being press fitted into the block to prevent axial movement of the shaft 240. The spur gear or pinion 242 is mounted between the ballbearing 282 which is held on the reduced end of the shaft 240 by a nut 284 and a shoulder formed on the shaft. The bearing 280 abuts against a similar shoulder at the opposite end of the shaft. The bearing 280 is further secured by a bearing retainer 286 bolted to the bearing block 230 and the bevel gear 238 is held on the end of the shaft by a suitable retaining nut 288.

The bevel gear 236 is mounted in a recess 290 in the cap 228 and has an elongated bearing sleeve 292 formed integrally therewith (FIG. 5). The bearing sleeve 292 is mounted in a bore of a hat-shaped bushing 294 which is fixed to the cap 228 by suitable bolts and has an upper flat, circular bearing surface engaging the underside of the bevel gear 236, thereby accurately locating it within the recess 290 and holding it against reciprocation during vertical movement of the drive shaft 220 in either direction.

As seen most clearly in FIG. 7 the piston rod 250 has a lower end 251 projecting from the lower end of the cylinder-piston combination 246, and it is fitted with an adjustable switch actuating collar 253 which is positioned to engage and close limit switch LS5 when the rack 244 is in the down position. This condition will occur at the end of each honing cycle and will remain in effect until the start of a new cycle. The collar 253 is adjustable to accommodate variations in the stroke of the piston rod 250, and its location should be adjusted each time that the position of the stop ring 276 is changed.

*Compensation for Stone Wear*

The mechanism 66 compensating for the wear of the honing stones is shown generally and schematically in FIG. 4, and in greater detail in FIGS. 6, 7, 8, 9, 10, and 11, and is driven from the pneumatic cylinder 246 which initially expands the stones. It includes a rack 300 actuated from the yoke 252 and which is in engagement with a spur gear or pinion 302 fixed to a shaft 304. Opposite the gear 302 is a worm 306 in engagement with a worm wheel 308 which may be selectively coupled by a clutch 310 to a shaft 312 disposed generally parallel to the shaft 240. The shaft 312 carries a bevel gear 314 in mesh with a bevel gear 316 on a splined end 317 of the stone wear compensation shaft 190. The clutch 310 is selectively operated by a pneumatic cylinder 318 which will be known as the compensation clutch actuating cylinder.

At the end of the honing cycle, when the stones are being collapsed to permit withdrawal of the honing tool from the honed workpiece, the cylinder-piston 246 is operated to move the yoke 252 upwardly (FIGS. 4, 7, 8, and 11). This drives the rack 300 upwardly and in turn drives the gear 302, shaft 304, and worm 306, and consequently the worm wheel 308. At the same time the compensation clutch actuating cylinder is briefly energized to move the clutch 310 to engaged position, thereby to connect the worm wheel 308 to the shaft 312 to effect an incremental driving movement of the bevel gear 314 which in turn drives the bevel gear 316. The latter gear in turn drives the compensating shaft 190 an incremental amount, usually less than one rotation and depending upon amount of stock removed and the hardness of the honing elements. It turns in the nut 196 (FIGS. 12 and 13) to set itself downwardly therein a very tiny distance, thereby adjusting the pushrod 146 downwardly in the spindle tube 112 so that when the stones are expanded at the start of the next honing cycle, they start from the compensated position. The movement of the compensation rod 190 and therefore the pushrod 146 is such that it compensates for the wear which the stones had suffered during the previous honing cycle.

Referring particularly to FIGS. 6 to 11, it will be observed that the rack 300 is formed as a cylindrical bar 320 vertically slidable in a bore 322 in the bearing block 230 and provided at one side with teeth 324 in mesh constantly with the teeth of the pinion or spur gear 302.

The rack bar 320 is biased downwardly (FIG. 8) by a spring 326 which is received in a bore 328 in the bar and acts against a shoulder 330 between the main bore 322 and a smaller counter bore 332 in the block 230. The downward movement of the rack bar is limited by a headed bolt 334 having a tapped lower end 336 screwed into the main body of the rack bar 320, the under side 338 of the head thereof being adapted to abut against the top of the bearing block 230 at the end of the downward stroke.

The rack bar 320 is arranged to be moved upwardly from the yoke 252 by means of a bolt 340 carried in the yoke to one side of the rack 244 on an adjustable nut 342. The bolt 340 coacts with a stop bolt 344 screwed into the lower end of the rack bar 320 and secured in position by a lock nut 346. The bolt 340 projects through an opening 348 in the yoke and is adapted to be turned relative to the positioning nut 342 so that its position relative to the bolt 344 may be adjusted. Thus the distance the rack bar 320 can project from the lower end of the bore 322 at the end of the downward stroke of the piston in the cylinder 246 is determined by the under side of the bolt head 338. On the other hand, the distance the rack will be moved upwardly or in the stone compensation adjustment direction is determined by the point of contact between the bolts 340 and 344 which are carried respectively by the yoke 252 and the rack bar 320. Thus both of them can be adjusted to determine the amount of compensation to be taken up through the compensating shaft 190. It should be understood that when the rack is at the bottom of its stone expansion stroke there will be a space between the ends of the bolts 340 and 344 and that the stone wear compensation rack 300 will have an appreciably shorter work stroke than that of the rack 244.

The shaft 304 is mounted in a bore 350 in the bearing block 230 on a pair of bearings 352 and 354 (FIG. 9), bearing 352 held against a shoulder at one end of the bore 350 and the bearing 354 held in place by a hat-shaped bearing retainer 356 which is bolted to the bearing block 230. The spur gear or pinion 302 is keyed to the outer end of the shaft 304 (FIG. 9) and is held there by a retaining nut 358 screwed onto the outer end of the shaft. The worm 306 is of the sleeve type and is held against a shoulder on the shaft 304 from the bearing 354 by a spacer sleeve 360. Thus, this unit is accurately positioned within the bore 350 which is appropriately counterbored to receive the bearing 354 and the bearing retainer 356, and accurately locates the pinion 302 and the worm 306.

As noted previously, the worm 306 which is keyed to the shaft 304 is in constant mesh with a worm wheel 308 which is freely rotatable upon the shaft 312 at a midsection 362 thereof to be driven in both directions by the worm. The worm wheel 308 is selectively coupled to the shaft 312 by the clutch 310. The clutch 310 is of the cone type and has a cone member 364 nonrotatably and slidably mounted on the shaft 312 by splined section 366, and has an external conical surface 368 adapted to coact with an internal conical surface 370 on a tubular extension 372 integral with the worm wheel 308 and telescoped over the conical surface 368. The clutch member 364 is adapted to be reciprocated on the splined section 366 of the shaft 312, and when in the retracted or disengaged position the gear 308 rotates freely in either direction on the shaft without imparting any driving movement thereto, but when the conical surfaces 368 and 370 are engaged (as they are shown in FIG. 6) the worm wheel imparts a driving motion to the shaft 312 to drive the bevel gears 314 and 316 and thus the stone wear compensation shaft 190.

The shaft 312 is journaled in the bearing block 230 on ball bearings 374 and 376, the outer ball bearing 374 being held in position by a nut 378 and the inner ball bearing 376 being held by bearing retainer 382 in the same manner as was done with respect to the shaft 240. A bevel gear 314 is held on the inner end of the shaft by a retainer nut 384 in the manner similar to the nut 288. This assembly insures that there will be no disturbance of the connection between the worm and worm wheel and the bevel gears due to the actuation of the clutch.

The cone clutch member 364 is shifted by a clutch shifter fork 386 having fingers 388 engaged in a slot 390 on the shiftable clutch member 364. The fork projects into shaft bore 391 through an opening 392 (FIGS. 7 and 10) and is fixedly mounted on the end of a clutch cam follower 394 which is slidable in a horizontal bore 396 formed jointly in a wall of the bearing block 230 and in a housing cap 398 bolted thereto. The clutch cam follower 394 is generally cylindrical, and at one side thereof has a longitudinal recess 400 intersected by a diagonal slot 402.

At right angle to the clutch cam follower there is mounted a stone compensating clutch cam 404 having a generally cylindrical configuration which is slidable in a bore 406 intersecting the bore 402 and similarly formed in the outer surface of the bearing block 230 and the housing cap 398. The cam 404 has a recess 408 formed at one side thereof from which projects a cam element 410 diagonally arranged at an angle complementary to the angle of the slot 402 and engaged in the slot as seen most clearly in FIGS. 6 and 9. Thus, as the cam 404 is reciprocated vertically or normal to the plane of the drawing in FIG. 6, the cam element 410 sliding in the slot 402 moves the cam follower 394 from clutch engaged to clutch disengaged positions, and vice versa.

The clutch cam 404 projects upwardly of the bore 406 and has an actuating arm 412 secured thereto by a key 414 and a retaining nut 416 screwed onto the upper tapped end of the cam 404, the upper end of the cam extending through a bore 418 in the arm 412. The opposite end of the arm 412 is bored and counterbored at 420 to receive the upper end of the piston rod 422, projecting from the cylinder 318, and a machine bolt 424 to secure the arm 412 to the piston rod 422.

Figure 9:
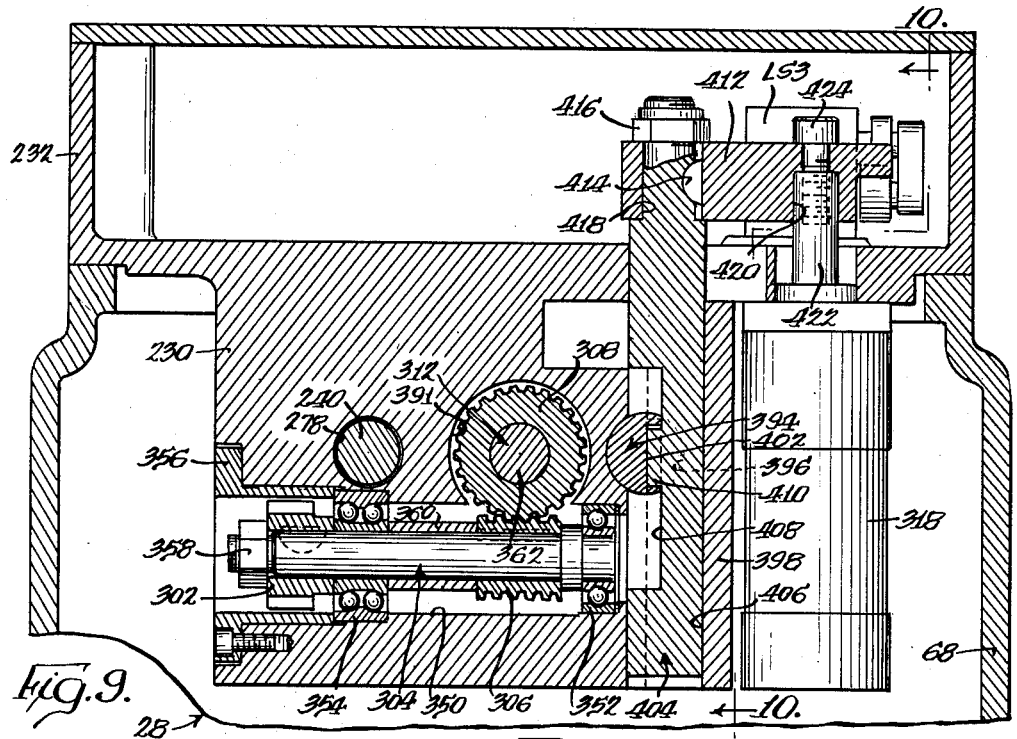
FIG. 9 is a vertical sectional view taken along the line 9—9 of FIG. 6, looking in the direction of the arrows, showing further details of the compensating mechanism drive.

As the piston rod 422 is forced upwardly, it lifts the compensating clutch cam 404, thereby moving the cam follower 394 to clutch disengaging position. When the piston rod 422 is moved in the opposite direction or downwardly as seen in FIG. 9, the cam 404 is similarly moved downwardly, and the cam follower 394 is moved into clutch engaging position. It should be observed that the pneumatic cylinder 318 is double acting so that the cam has a positive motion in both clutch engaging and clutch disengaging directions, and that its operation is independent of the operation of the piston-cylinder combination 246 except as the two are cyclicaly interrelated through the control system.

As seen most clearly in FIG. 11, the bevel gear 316 has a downwardly projecting tubular extension 426 which rotates within the bore of hat-shaped bushing 428 secured as by screws 430 to the cap 228. The upper annular end 432 of the bushing supports the bevel gear 318 by shoulder 434 so that it is held properly within recess 436 in the cap and is prevented against longitudinal movement as the splined section 317 of the compensation shaft 190 is reciprocated both during the compensation action and during the expansion and retraction of the honing elements. This just described structure is similar to that described with respect to the positioning and mounting of the bevel gear 236.

If desired, the compensating shaft 312 may be driven a predetermined incremental amount by an electric motor at the end of each honing cycle to compensate for the wear stones had during the cycle.

*Manual Adjustment of Stone Compensation Wear Mechanism*

It is desirable that the machine include a manual control to override the automatic device 66 for compensation for stone wear and that the manual control be readily accessible. As previously indicated, the casing 68 is provided with access openings. One of these is opening 442 (FIGS. 6 and 11) to the mechanisms 64 and 66 for initially feeding out the stones and for compensating for stone wear. It is closed by a removable cover 444 which may be bolted to the front of the casing 68, and the latter has a circular opening 446 therein to accommodate a manual adjustment knob 448.

Figure 10:
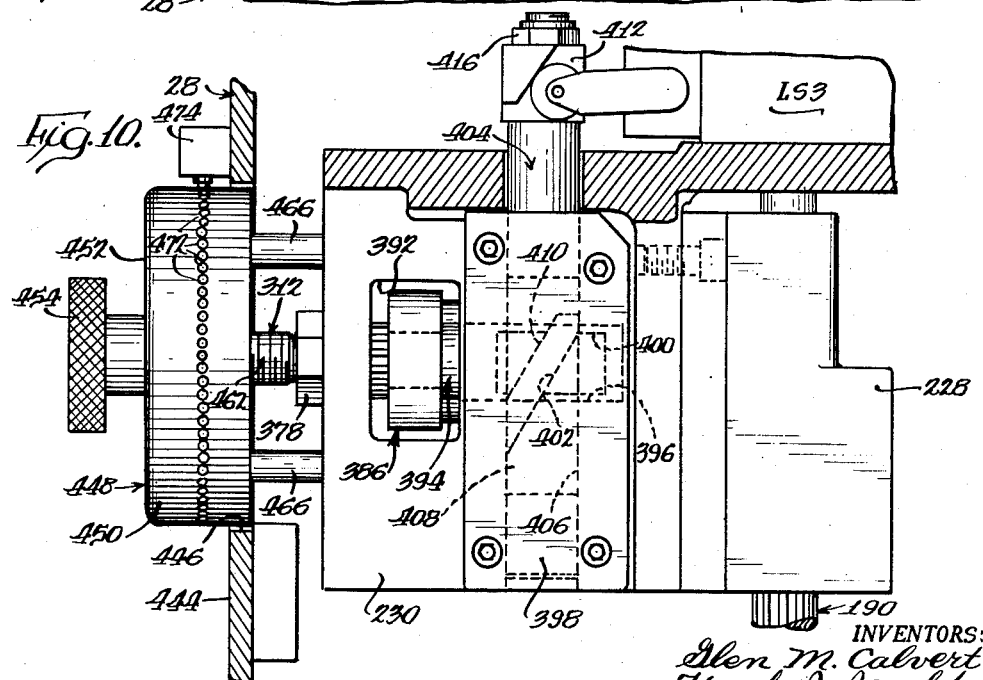
FIG. 10 is a vertical sectional view taken along the line 10—10 of FIG. 9, looking in the direction of the arrows.

The knob 448 is most clearly seen in FIGS. 6, 10 and 11 and has a cylindrical skirt portion 450 which fits closely within the opening 446, an outer face 452 from which outstands a finger grip 454 by means of which the knob is rotated in either direction. The knob is mounted on a reduced extension 456 of the compensator shaft 312 which fits within a bore 458 in the finger piece 454 and a lock screw 460 secures the knob 448 to the shaft against rotation thereon.

Inwardly of the extension 456 is formed a left handed threaded portion 462 on the compensator shaft. The portion 462 is screwed through a reset dog and torsion bar 464 of elongate shape which is guided against rotation by a pair of long bolts 466 which are screwed into tapped sockets in the bearing block 230 (FIG. 11). Thus, as the shaft 312 is rotated in either direction, the bar 464 moves inwardly or outwardly on the threaded portion 462 of the shaft. It cannot move inwardly beyond the lock nut 378 and its outward movement is limited by an adjustable collar 468 which is threaded onto the tapped portion 462 of the shaft and locked in position by a set screw 470.

It will be observed from FIG. 1 that the manual compensating knob 448 is on the front of the machine head 28 and in a position readily accessible to the operator. With the arrangement as described the operator turns the knob 448 in the clockwise direction to advance the stones in the tool, that is, to project them outwardly of the tool head. The knob 448 is turned in the counterclockwise direction to retract the stones, that is, to lift the stone wear compensating shaft 190 and thus permit the stones, when advanced by the mechanism 64, to be advanced a lesser amount outwardly of the tool head.

So that the operator need not actually look at the knob when he is adjusting the advancement of the stones, the periphery is provided with a plurality of depressions or tiny apertures 472. In the particular embodiment shown, there are sixty of them spaced apart an angular distance of 6°. These provide click stops for a spring pressed plunger device 474 of well known type mounted on the face of the cover 444.

The manual reset knob 448 has two functions. First, it enables the machine operator to advance the stones against the bore of the workpiece during the initial setup of the machine. When the stones have been changed in the tool 30, the tool is then moved into the work under manual control and the initial stone advance mechanism 64 is operated under manual control to expand the stones outwardly of the tool head and toward the bore of the workpiece. If the stones do not contact the bore, as might well be likely, the reset knob 448 is turned in the clockwise direction and the operator can observe their contact against the work. By counting the number of clicks of the plunger device 474 in the stops 472 after contact with the work the operator can determine the pressure with which the stones are being held against the work by means of the spring 226. When this has been done, the machine is then turned to automatic operation and the honing cycle proceeds as described.

Should the stone compensation device 66 be set through the adjustable stop mechanism shown in FIG. 7 so that the compensation for wear is not enough, then this may be made up manually by turning the stone wear compensation knob 448 in the clockwise direction. Similarly, if the compensation has been too great, then the knob 448 may be turned in the counterclockwise direction for withdrawing the stone compensation shaft 190. When this is found to be necessary, it is desirable that a suitable adjustment in the stop mechanism for the compensation rack be made so that this will not have to be done too frequently.

As the stones wear, it will be noted that the reset dog 464 moves inwardly and one of its beveled ends 476 will trip a limit switch LS7 (FIG. 11) which indicates through a warning light that the stones have been worn out and must be changed. When the stones have been overcompensated, a switch LS4 (FIG. 11) will be tripped and this will energize a warning light as will be explained in the following description of the control circuit. If an electric motor is used to drive the compensating shaft 312 then a readily accessible manual reversing control for it should be provided so that the operator can adjust for under and over compensation for stone wear.

Control Circuit

The control circuit is shown generally in FIG. 16 with a portion thereof detailed in FIG. 17. The switch operating buttons and indicating lights, which will be referred to hereinafter, are mounted on an operating panel or console and in the main the control relays and the switch mechanisms and wiring are contained within a separate housing in a manner well known in the machine tool art.

Power for operating the motor 46, motor brake 46B, and coolant motor 482, is derived from a three phase, 220 volt, 30 ampere conventional industrial source 484 which is provided with appropriate safety fuses and circuit breakers and master gang switch 485. The relay operated control system is connected to the three phase source by a stepdown transformer T1 and operates at 110 volts and 60 cycles. For convenience, the circuit components are shown as connected between two lines or buses L1 and L2 connected to opposite ends of the secondary of the transformer T1. The line L1 is provided with a pressure switch PS1 which is closed when there is adequate air pressure to move the head 28, and thereby to condition all of the relay subcircuits for operation.

The control circuit components are shown when the circuit is inactive, the switches 485 and PS1 open, the head 28 raised to "normal up stop" position, and the solenoids and relays deenergized.

The machine operation is started by making certain that the air pressure is high enough to close the switch PS1 and by closing the master switch 485.

The head 28 is lowered to honing positioning by energizing, either manually or automatically, the relay CRB to close the switches CRB1 in the circuit to solenoid 498 which controls the admission of air to lower end of the power unit 40 to move the head downwardly to honing position.

When the head is lowered to the honing position, position limit switch LS1 is closed which energizes relay CRC in series therewith between the lines L1 and L2. A relay CRC controls a number of other switches as will be apparent as the description proceeds. Selection of whether the machine is to be operated manually or automatically is made by turning selector switch 486 in subcircuit 488 to the appropriate position of "manual" or "automatic," so that the switch will be either open or closed, respectively. The circuit 488 includes a normally open start switch S1 which also has contacts S1A in the circuit 490 to insure disengagement of the clutch 310 under control of relay CRP, which contacts are closed when the switch S1 is closed.

Prior to manual operation of the machine or simultaneously with the closing of the start switch S1, the supply of coolant to the honing area is started. This is done manually by closing start coolant switch 494 in series with the relay C. The circuit to this also includes a manually operable stop coolant switch 496, a normally closed switch CRE1, controlled from the relay CRE. Closing the coolant switch 494 energizes the relay C, which immediately energizes a switch C1 in the holding circuit paralleling the switch 494. At the time the switch 494 is closed, switches C2 in the circuit to the coolant motor 482 will be closed, thereby energizing this motor to drive the coolant pump for the supply of coolant during the honing operation. On automatic operation, when the start switch S1 is closed, the relay CRD is energized which closes a switch CRD2 in a holding circuit paralleling the series of switches controlling the coolant motor relay C, and consequently even though the switch CRE1 be opened later in the operation of the machine, coolant will continue to be supplied to the honing area during the honing cycle.

The circuit 488 also includes a manually operatable normally closed emergency return switch 492, normally closed limit switches LS4 and LS7, normally open switch CRA1, and normally closed switch CRP1 which is opened by relay CRP when the head 28 is moving up. The switch CRA1 is controlled by a relay CRA which is in series with the limit switch LS5 which is closed when the machine is idle and is operated from the cylinder-piston 246 when the honing elements are expanded to honing position. Thus it is closed when honing elements or stones are in their retracted position, which is the position they will occupy when the tool 30 is disengaged from the work and the head 28 retracted. As soon as the switches PS1 and 485 are closed, the relay CRA will be energized through the closed switch LS5 to close the switch CRA1. The circuit 488, therefore, to the relay CRD is at the start of a cycle composed of closed switches with the exception of the manually operable start switch S1. When it is desired to operate the machine automatically, the start switch is closed which energizes the relay CRD. This closes the switch CRD1 in the holding circuit in parallel with the switches CRA1, S1, LS4, and LS7.

Energization of the relay CRD also closes a switch CRD3 in series with the relay CRB which controls the switches CRB1 to the solenoid 498 for moving the head 28 from retracted position to honing position. Closing the cycle switch 486 energizes the relay CRE, which opens the switch CRE1 to remove coolant supply from manual control. However, relay CRD simultaneously closes the switch CRD2 in parallel with switch CRE1 so that coolant will be supplied to the honing area automatically.

The relay CRE opens normally closed switch CRE2 which is in series with a manually operable switch 500 in the inching circuit for the head control relay CRB. However, this relay remains energized since these switches are paralleled by a circuit including switch CRD3 which is closed by the relay CRD. The relay CRE also opens normally closed switch CRE3 which is in series with a manually operable switch 502 for manually controlling rotation of the hone. Thus, when the machine is to be operated automatically, the manually operable circuits for supplying the coolant, inching the head, and rotating the hone are opened by the energization of the relay CRE.

The relay CRE closes normally open switch CRE4 in the circuit to the motor relay M, and closes the switch CRE5 in the circuit to the relay CRG, closes the switch CRE6 in the circuit of the relay CRH, and opens normally closed switch CRE7 in one of the parallel circuits to the relay CRP, the latter circuit also having normally open contacts 492A of the manually operable emergency return switch 492. It closes the switch CRE8 which is in a parallel circuit to the relay CRP, which would be energized when the machine is operating automatically.

Closing of the switch LS1 by movement of the head to honing position energizes the relay CRC in series therewith. Energization of this relay closes switch CRC1 in circuit 504 controlling the termination of the honing operation, and therefore conditions this circuit for energization at the appropriate time in the honing cycle. It also closes switch CRC2 in series with the relay CRO and with a normally closed switch CRM1. Relay CRC also closes normally open switch CRC3 in series with the relay CRG and previously mentioned switches CRE4 and CRE5.

Energization of the relay CRO by closing the switch CRC2 closes the switch CRO1 in a holding circuit paralleling switch CRC2 so that when this switch is opened the relay CRO will remain energized. Energization of the relay CRO also closes switch CRO2 in series with switches CRE4 and CRE5, and also in series with a normally closed switch CRN1 which is under the control of the relay CRN. When the switches CRO2 and CRE4 have been closed, the motor relay M will be energized, being in series with normally closed switch CRN1 and CRM2. Energization of the relay M closes the switch M1 to relay CRG, thereby energizing it since the switch CRC3 had been previously closed, and also energizes the switches M2 in the three phase circuit to the motor 46 which drives the honing tool. At the time the relay M is energized, the relay CRF in parallel therewith is energized to close the switches CRF1 in the circuit to the motor brake 46B to release the latter.

Energization of the relay CRD closes switch CRD4 in series with the sizing gauge switch 52 which is closed when the sizing gauge 50 enters the workpiece bore at the end of the honing operation. These switches are in the circuit with the relay CRH which is not energized until the termination of the honing operation. Energization of the relay CRS when the head 28 is up to normal stop position and the switch LS5 is closed, also closes switch CRS1 which is in series with circuits to the counting relays CRK, CRL, CRM, and CRN which insure that the spindle stops at the stop of a stroke. It is in series with the relay CRK through a switch 505 in the proximity limit switch amplifier circuit 506 shown in FIG. 17. The switch 505 is normally open but is closed when the proximity limit switch amplifier is energized which occurs on every stroke of the spindle 32. However, the relay CRK is not energized unless the head is at the normal stop position and the relay CRS energized to close the switch CRS1.

At the time relay CRG is energized through the circuit which includes the switches CRO2, CRE4, CRE5, M1, and CRC3, it closes a pair of switches CRG1 in the circuit to the solenoid 508 which controls the air pressure for the cylinder 246 in the mechanism for expanding the honing elements to their honing position. This circuit also includes a normally closed switch CRH1 under control of relay CRH which is included in the circuit 504 which controls the termination of the honing operation and the retraction of the honing head.

The honing operation will continue normally until the bore has been honed to size when the gauge 50 enters the bore and the switch 52 is closed. It will be noted that previously switch CRD4 had been closed as well as switch CRE6. Consequently, closing of the switch 52 will energize relay CRH. This will open switch CRH1 in series with the solenoid 508, thereby deenergizing that solenoid and permitting the hones to be contracted by moving the cylinder-piston 246 to hone retracted position and withdrawing the push rod 146. Energization of relay CRH will also close switch CRH2 in a holding circuit paralleling switches CRD4 and 52, and also the manually closable switch contacts 492B controlling the emergency return of the hone and head. Thus, the solenoid CRH will be maintained in energized condition until the relays CRC and CRE have been deenergized, the former being deenergized when the switch LS1 is opened when the head 28 moves upwardly from honing position.

Energization of the relay CRH also closes switch CRH3 which is in series with position limit switch LS3, which is closed when the clutch 310 is energaged, and switch CRA3 which had been closed at the time the relay CRA was energized when the stones were in retracted condition. Energization of the relay CRH also closes the pair of switches CRH4 in series with solenoid 510 which controls the flow of air under pressure to the clutch cylinder 318 to cause it to move in the clutch engaging direction. Closing the switch LS3 energizes relay CRP to close switch CRP2 in the holding circuit paralleling switches LS3, CRH3, and CRA3.

Previously, when the head 28 had moved down from the normal up stop position, limit switch LS6, which has a pair of contacts in the circuit to the solenoid CRP, had closed, and which has another pair of contacts LS6A in the circuit to the relay CRH, had opened. The first pair of limit switch contacts SL6 will remain closed for so long as the head 28 is out of its normal up stop position. As soon as it is returned to it it will open, thereby breaking all circuits to the relay CRP and energizing and deenergizing switches controlled thereby, respectively. Energization of the relay CRP opens switch CRP3 in series with the normally open contacts S1A and relay CRS, and it also closes switches CRP4 in circuit to solenoid 512 controlling air supply to the power device 40 to raise the head 28 out of honing position. It also opens switch CRP5 in series with the solenoid 498 controlling downward movement of the head.

When the head has been returned to its normal up stop position, limit switch LS1 will open, thereby breaking the circuit to the relay CRC, to open the switches CRC1, CRC2, and CRC3. However, when the head is returned to its uppermost position, the stones are retracted, relay CRA is once again engaged, thereby closing switches CRA4 in the circuit to solenoid 512 which operates air cylinder 318 to disengage the clutch. Also switch LS6 will open to deenergize the relay CRP and thereby to open the switches CRP4 in the circuit to the solenoid 514 to terminate the upward movement of the head.

During the upward travel of the head 28 the mechanism 66 for compensating for stone wear had been operated incrementally to set the push rod 146 downwardly in the spindle. When the head reaches its normal up stop position, the limit switch LS6A closes to energize the relay CRS thereby to close the switches CRS2 in the circuit to the relay 512 which causes the clutch 310 to be disengaged. The energization of the relay CRS also closes the switch CRS1 in series with the proximity switch 505 and the counting relays CRK, CRL, CRM and CRN which control terminating reciprocation of the spindle 32 at the top of its stroke.

The circuit to the relay CRL includes a switch CRK1 which is closed when the switch 505 is open which occurs at the top of each stroke of the spindle 32. Closing of the switch CRS1 when the head 28 is restored to its normal up stop position near the end of the honing cycle energizes the relay CRL, when the spindle 32 is at the top of its stroke, through the circuit including closed switches CRO2, CRE4, CRE5 and CRS1. Energizing the relay CRL closes switch CRL1 in a holding circuit paralleling the switch CRK1 thus locking relay CRL in energized condition. At the bottom of the spindle stroke switch 505 will close to energize the relay CRK to open switch CRK1, which has no effect, and to close the switch CRK2 in series with the relay CRN to energize this relay through the circuit which includes the closed switches CRO2, CRE4, CRE5, CRS1, CRL1 and CRK2. Switch CRN2 in the holding circuit paralleling the switch CRK2 is closed to lock relay CRN in energized condition. At this time the switch CRN1 in series with the motor relay M is opened to deenergize this relay and open the motor switches M2 to cut off the current to the motor 46 which has sufficient inertia to coast and raise the spindle 32. When the spindle was at the bottom of its stroke with the switch 505 closed and the relay CRK energized the switch CRK3 in the circuit to the relay CRM had been open. As the spindle returns to the top of its stroke the switch 505 opens, the relay CRK is deenergized and the switch CRK3 closes to energize the relay CRM through the circuit which includes closed switches CRO2, CRE4, CRE5, CRS1, CRL1, CRN2, and CRK3. Energization of the relay CRM closes holding circuit switch CRM3 to lock relay CRM in energized condition. The relay CRM now opens the normally closed switch CRM2 in the motor relay circuit which deenergizes the brake relay CRF opening the switches CRF1 to set the motor brake 46B. Setting of the brake stops rotation of the drive shaft 42 and the reciprocation of the spindle 32 at the top of its stroke.

Energization of the relay CRM opens the switch CRM1 in series with the relay CRO to deenergize the latter. When the relay CRO is deenergized the switch CRO2 in the circuits to the motor and brake relays and to the counting relays is opened to deenergize these relays and to return the circuits to the condition shown in FIG. 16.

It should be noted that when the machine is to be operated manually, switch 486 is turned to manual position at which time it will be open and thereafter switches 500 and 502 can be selectively closed under manual operation. Switch 500 controls the circuit to the relay CRB which controls switches CRB1 in the circuit to solenoid 498, inching the head down to working position. Operation of switch 502 rotates the hone through the normally closed switches CRE3 and CRN1 to relays M and CRF. Manually operating the switch 502 also closes the circuit through switch CRN1, the motor relay M closes switches M2, and the brake relay CRF closes the switches CRF1.

It should be noted that at the end of a manually controlled honing cycle the sizing switch 52 will close and the operation of the counting relays will proceed as previously described through the switch CRE3. The head will also be returned to its normal up stop position under control of the relay CRP.

As noted previously, the circuit includes some emergency controls. For example, the emergency return button 492 opens the main circuit to relays CRD and CRE. It also closes the circuit through switch 492B to the return solenoid CRH in the return circuit. It should be noted that switch CRC1 had been previously closed. It also closes the switch 492A in the circuit to relay CRP which controls another portion of the return circuitry paralleling limit switch LS3, it being noted that switch LS6 had previously been closed when the head had moved from its normal up position, thus permitting not only the withdrawal of the honing tool, but the return of the head to the normal up position.

The head 28 can be moved to its tool changing position by pressing button to switch 492A in the circuit to the relay CRP controlling upward movement of the head. It should be noted that as the head 28 moves up or down through the normal up stop position the switch LS6A in the circuit to the relay CRS is closed to close the circuit to the solenoid 512 to insure that the clutch 310 is deenergized to prevent inadvertent operation of the stone wear compensation mechanism 66.

In the event that the stones should be overcompensated, switch LS4 having contacts LS4A in the circuit to a pilot light 516 will be actuated and the circuit to solenoid CRD opened, but this is not particularly important since switch S1 is normally only momentarily closed. However, it would give the operator an indication that the switch 492 should be operated for the purpose of withdrawing the honing tool and to relieve the compensation of the stones by turning the adjustment knob 448 in the counter-clockwise direction.

In similar fashion, limit switch LS7 is actuated when the stones are worn out. This opens a pair of contacts in the circuit to the relay CRD and closes a pair of contacts LS7A in the circuit to the warning light 517. Under these circumstances, switch 492 is operated to raise the head 28 above the normal up stop position, and the machine is shut down while the stones are replaced.

Referring now particularly to FIG. 17, the proximity limit switch amplifier circuit which might also be described as a single pulse multivibrator circuit 506, has a power supply 518 including a transformer T2, the primary of which is connected by conductors 520 and 522 between lines L1 and L2, respectively. The secondary to the transformer T2 is connected to a conventional full wave rectifier 524 which provides a B+ tap 526.

The circuit includes a double diode 12AU7 tube 528 which has an appropriate 6-volt filament circuit 530 connected to the secondary of transformer T2 and a cathode bias circuit 532.

One side 528A of the tube has a grid 534 connected directly to ground and the other side 528B has a grid 536 connected through a filter circuit including a resistor 538 and a shunt feed capacitor 540 to a conductive pickup head 542. The pickup head 542 has its position generally indicated in FIG. 4, and includes a coil adapted to be influenced by a metallic element in one of the moving parts of the mechanical operating system, preferably one of the drive elements for stroking the spindle 32 which has the same positions at both ends of the spindle stroke or reciprocating motion.

The plate 544 of tube part 528A is connected to the B+ bias tap 526 through a 22K ohm resistor 546 and the plate 548 of tube part 528B is connected through a 10K ohm resistor 550 to the same B+ tap. The relative value of the resistors 546 and 550 is thus about 2.2 to 1, but since the grid 534 is connected to ground, it is more positive than the grind 536, and consequently the side 528A of the tube conducts substantially continuously, while that of the side 528B does not conduct.

An oscillator feedback circuit 552, including a capacitor 554, connects the plate 544 to the bias for the grid 536 and specifically to a variable resistor 556 in parallel with a capacitor 558, both of which are connected to ground. The pickup coil 542 and capacitor 558 comprise a resonant circuit which has its characteristics changed depending upon the presence of a metallic object in the field of the pickup coil 542. The potentiometer 556 is used to set the sensitivity of the pickup 542.

Normally the oscillator feedback will vary slightly the positive signal on the grid 536 but the conductive signal from the plate 548 will be slight unless the impedance of the coil 542 is at a minimum which will occur when there is not metallic object in the field of the coil. At such times the tube side 528B will conduct strongly to send a sharp pulse of current from the plate 548 through the resistor 550 back to ground through the tap 526.

This will place a nigh potential on a relay 560 which is connected through a rectifier 562 and a capacitor 564 to the circuit of the tube plate 548. The relay 560 is included in a tank circuit 566 connected to ground and including an inductance 568. An exceedingly high rise in potential at tap 570 which is in series with the capacitor 564, will produce a surge of current through the relay 560. The latter is energized momentarily to close the proximity sensitive switch 505 in series with the relay CRK (FIG. 16) to energize this relay and have it perform the switch closing and opening operations which have been previously described.

The operation of the relay CRK triggers sequentially energization of the relays CRL, CRN, and CRM thus providing a single stroke of the honing machine after the switch CRS1 has been closed following the entry of the sizing gauge 50 into the bore being honed, which of course then energizes relay CRH.

While the side 528B is continually sending an oscillatory signal it is ordinarily not strong enough to operate the relay 560 unless the impedance of the coil 542 is lowered which occurs when there is no metal in its field and this occurs when the spindle 32 is at the bottom of its stroke.

It should be noted that the proximity circuit 506 is actuated at every stroke of the spindle, that the relay 560 drops out when a metallic element of the spindle reciprocating drive is in the field of the pickup coil 542, and that the switch 505 is closed when the spindle 32 is down.

However the circuit to the relay CRK is not energized until the switch CRS1 has been closed.

Operation

In considering the operation of the machine, assume that the operation from an initial setup, that is, one in which the tool 30 is provided with a new set of honing stones for honing a new lot of workpieces. It is thus necessary to set and adjust the stones in the head for initial expansion to contact the work with the proper amount of pressure for subsequent automatic operation.

The stones are placed in the tool 30, and the tool connected to the lower end of the spindle 32 with the machine head 28 in the up position and therefore with the circuit components as shown in FIG. 16.

The master gang switch 485 is closed, and the switch 486 is moved to manual operation position, that is, open, and therefore the solenoids CRD, CRE, and CRG, controlling automatic machine operation, are isolated from energization. If the air pressure is adequate, the switch PS1 will close.

The coolant supply is turned on by closing the coolant supply switch 494 to energize the relay C to close the holding circuit switch C1 and the coolant pump motor switches C2.

The switch 500 is closed to energize the relay CRB and thus close the switches CRB1 in the circuit to the solenoid 498. The head 28 then moves downwardly, and by opening and closing the switch 500, its rate of descent can be carefully controlled and observed. The head 28 is moved down until the tool 30 enters the workpiece bore.

When the head 28 is in down position, the stone wear compensation mechanism 66 is manually operated to expand the stones into contact with the work. The efficacy of their cutting action can be determined by rotating and stroking the tool 30 by closing the switch 502. It will be noted that in closing the switch 502 the relay M is energized which closes the switches M2 in the circuit to the motor 46.

If the stones contact the work with too great pressure, then the compensation adjustment knob 448 is turned in the counterclockwise direction to relieve the expansion. On the other hand, if the stones do not contact the work, then the knob 448 is turned in the clockwise direction until they make contact, and it is turned further to add the expansion and honing pressure through the medium of the expansion pressure control spring 226.

When the stone adjustment has been made, the head 28 is raised by pushing the return button to close switch 492A in the circuit to the relay CRP. Energizing the relay closes the switches CRP4 and opens the switch CRP5 which operates the power unit to raise the head. With the head in the normal up stop position the switch LS6A is closed to operate the relay CRS to insure disengagement of the clutch.

The machine has been tested and is now ready for automatic operation.

The switch 486 is now turned to the automatic operation or closed position, thereby conditioning the circuit 488 for utilization. It should be noted that in this circuit the switch CRA1 had been closed by retraction of the stones and the closing of the limit switch LS5, the limit switches LS4 and LS7 are normally closed, switch CRP1 is normally closed, and the emergency return switch 492 is of course normally closed. Moving of the switch 486 to automatic operation energizes the relay CRE which opens switch CRE3 in the manual rotation of the hone circuit and the switch CRE2 in the head inching circuit, thereby rendering these circuits inoperative during automatic operation of the tool. Switches CRE4 and CRE5 are closed to condition the circuit to the solenoid CRG.

The start button S1 is closed, and the relay CRD is energized, closing the holding circuit through the switch CRD1 and the circuit to the coolant relay C through the switch CRD2. Therefore the coolant will continue to be supplied throughout the entire cycle even though the coolant stop switch 496 be accidentally closed. Closing the switch CRD3 by the relay CRD energizes the relay CRB to close the switches CRB1 in the circuit to the head down solenoid 498 and this moves the head 28 down in the manner previously described except that its movement is continuous and the switches LS6 and LS6A are moved to closed and open positions respectively, conditioning the circuit for later operation. When the head reaches its proper position, it closes limit switch LS1, energizing the relay CRC which starts a train of operations which eventually ends in energization of the relay CRP which opens the switch CRP4, breaking the circuit to the solenoid 498 and terminating movement of the head. At the same time the honing stones had been expanded in the tool 30 through the energization of the relay CRG and the closing of the switches CRG1. The motor 46 had been started since the relay M had been energized, closing the switches M1 and M2.

Honing continues normally until the gauge 50 enters the bore of the work. At this time switch 52 is closed and the circuit to the relay CRH is completed, the switches CRC1 and CRD4 and CRE6 having been previously closed in turn. The energization of the relay CRH opens the switch CRH1, breaking the circuit to the solenoid 508 which controls the expansion of the stones. At the same time switches CRH4 are closed, energizing the solenoid 510 to cause engagement of the clutch 310. The engagement of the clutch and the opening of the circuit to the stone expansion solenoid 508 are accomplished at substantially the same time the head is moved in the upward direction by closing the switches CRP4. Thus, as the head is being moved in the upward direction, the compensation of the stones is being made by moving the stone compensation shaft an incremental distance downwardly by turning it in the nut 196.

Immediately prior to this, the pickup head 542 had energized the proximity circuit 506 to close the switch 505 to the solenoid CRK. This controls one stroke of the tool and when that has been completed, the head is withdrawn and the various circuits are restored to the positions shown in FIG. 16 with the head in the up position, with the stones retracted or collapsed and the rotation of the hone terminated.

If, during the honing cycle, the compensation of the stones had been too great, the limit switch LS4 would have opened, closing the contacts LS4A in the circuit with the warning light 516 which appears on the console. This tells the operator that he should turn the stone compensation adjustment knob 448 in the counterclockwise direction.

When the stones have worn, the limit switch LS7 will be opened, closing the contacts LS7A in the circuit with the warning light 517. This will tell the operator that the stones should be changed and at that time the switch PS1 will be opened with the head in the up position.

The circuit illustrated is for an automatic, single cycle, multiple stroke honing operation. This merely means that the start button S1 must be operated for each workpiece which appears in the machine. Should, however, it be desired that the machine be fully automatic, a switch comparable to S1 would be closed with the proper positioning of a workpiece in a jig or fixture immediately below the tool 30 when the head is in the up position. This type of operation is well known in the art and need not be described.

Modifications

A modified arrangement for exerting pressure on the honing elements is shown in FIGS. 18 and 19 wherein previously described elements are identified by the same reference characters.

The cap 182 of the reciprocating head 60 has an upstanding generally tubular extension 192a of slightly different shape than the extension 192 to provide at its upper end the relatively coarse external threads 204 engaged by the gear 206 and at its lower end an enlarged cavity 580 into which the upper end of the push rod 146 and the lower end of the stone wear compensating shaft 190 project. The lower end of the shaft 190 is threaded at 194 and is screwed into a feed nut 196 which has an arm 200 projecting through a slot 202 in the extension 192a and the cap 182. The arm 200 carries an upstanding bolt 581 at its outer end which is adapted to operate the switch LS4 to indicate overcompensation of the honing elements.

The arm 202 extends through a radial slot 582 in the underside of a ring 584 which overlies a second ring 586. The rings 584 and 586 encircle the enlarged lower portion of the tubular extension 192a. A plurality of bolts 588 extend through suitable apertures in the rings 584 and 586 and have their ends threaded into tapped openings in the lower cap 212a of a modified form of gear case 208. The bolts are shouldered at their tapped ends at 590 so that their heads 592 are spaced a predetermined distance from the underside of the gear case 208 and in effect the rings 584 and 586 hang on these bolts.

A plurality of springs 594 are confined between the ring 584 and the underside of the gear case 208. The upper ends of the springs are received in recesses 592 in the lower face of the gear case cap 212a. In the form shown four of the springs 594 encircle bolts 588. There are only four hanger bolts 588 and in between them are four pins 596 which are carried in and project slightly above the top surface of the ring 584 to retain the lower ends of the springs 594 which are not carried around the hanger bolts 588. There are accommodations for a total of eight pressure exerting springs in the assembly. It is appreciated, however, that it is not necessary always to use eight springs. If lesser pressure is desired, six, four, three or even two springs may be used in the unit. It should be noted, however, that it is desirable that the number of springs be selected so that the pressure would be exerted evenly around the surface of the ring 584.

This group of compression springs has precisely the same function as did the single spring 226 described in connection with the previous embodiment. In use it is not essential that the rings 584 and 586 be in face to face contact and there will be a slight space therebetween so that the springs 594 may exert the desired pressure.

The use of the modified structure shown in FIGS. 18 and 19 permits selection of a proper honing pressure which is dictated by the hardness of the metal being honed and the character of the honing stones themselves, thus insuring a substantial amount of flexibility to the use of the machine.

There is also shown in FIG. 18 a modified arrangement for connecting the push rod 146 to the stone wear compensating shaft 190 which insures that the push rod 146 will follow the upward as well as the downward motion of the shaft. This is desirable when the cam lift of the honing tool is quite low to prevent wedging of the cams against the honing elements and thus locking the push rod in the hone element expanding position. Usually the return spring for the push rod 146 has insufficient strength to pull the push rod from the hone element expanded position.

This connection includes a stud 598 projecting downwardly from the lower end of the shaft 190 and through a bearing retainer 600. The stud projects into an axial cavity 602 formed in the head of the push rod 146. The stud 598 has an annular groove 604 adjacent its outer end in which are located three retaining balls 606 held in radial apertures 608 in the wall surrounding the cavity 602. The balls are retained in position by a sleeve 610 which also forms a part of the bearing retainer for the ball bearings 612. This assembly is held in position by a ring nut 614 threaded onto the upper end of the push rod 146 and screwed tightly against the underside of the retainer sleeve 610.

This structure insures that when the shaft 190 is raised in the gear case 208 the push rod 146 will be drawn in the stone retraction direction. It is also to be understood that the push rod 146 would be physically connected to the push rod in the tool 30 in a manner which is known in the art.

If desired, the compensation clutch shaft 312 can be driven by an electric motor rather than manually turned by the adjustment knob 448 for initially setting up the machine and for adjusting for compensation for stone wear if the compensation be too great or insufficient. The manual control for such a motor would be located on the console and in a position convenient to the operator.

If desired, the proximity limit switch circuit shown in FIG. 17 may have substituted for it a vane operated proximity limit switch of the type manufactured by General Electric Company, Model CR115A. The vane for this switch would be fixed to a moving part in the mechanism for reciprocating the spindle 32 such as the crank driven from the shaft 160.

*Conclusion*

From the foregoing description it is apparent that the objectives which are claimed for this invention are fully attained.

While preferred embodiments of the mechanically operated honing machine of this invention have been shown and described, it will be apparent that numerous variations and modifications may be made therein without departing from the underlying principles of this invention. It is, therefore, desired by the following claims, to include within the scope of the invention all such modifications and variations by which substantially the results of this invention may be obtained through the use of substantially the same or equivalent means.

What is claimed as new and desired to be secured by United States Letters Patent is:

1. In a honing machine, the combination comprising, a tubular spindle mounted for reciprocation and rotation, means connected to said spindle for reciprocating and rotating the latter, a push rod slidably mounted within said spindle and adapted to coact with a push rod in a honing tool to expand honing elements carried by the tool into engagement with a workpiece bore to be honed, a movable shaft acting on said first named push rod to move the latter in the direction of honing element expansion, a tubular guide into which said shaft projects for axial and rotational movement therein, a hollow nut within said guide and into which said shaft is threaded, said nut having an arm projecting through a longitudinal slot in said tubular guide whereby said nut is restrained against rotation, a gear case mounted on said tubular guide for axial movement thereon, and resilient means interposed between said gear case and said arm and adapted to exert pressure on said push rods and the honing elements and to compensate for variations in the initial tolerances of the bore to be honed.

2. In a honing machine, the combination comprising, a tubular spindle mounted for reciprocation and rotation, means connected to said spindle for reciprocating and rotating the latter, a push rod slidably mounted within said spindle and adapted to coact with a push rod in a honing tool to expand honing elements carried by the tool into engagement with a workpiece bore to be honed, a movable shaft acting on said first named push rod to move the latter in the direction of honing element expansion, a tubular guide into which said shaft projects for axial and rotational movement therein, said guide being axially fixed relative to said spindle, a hollow nut within said guide and into which said shaft is threaded for axial movement relative to said guide and said spindle, said nut having an arm projecting through a slot in said tubular guide whereby said nut is restrained against rotation, a gear case mounted on said tubular guide for axial movement thereon, and resilient means interposed between said gear case and said arm and adapted to exert pressure on said push rods and the honing elements and to compensate for variations in the initial tolerances of the bore to be honed.

3. In a honing machine, the combination comprising, a tubular spindle mounted for reciprocation and rotation, means connected to said spindle for reciprocating and rotating the latter, a push rod slidably mounted within said spindle and adapted to coact with a push rod in a honing tool to expand honing elements carried by the tool into engagement with a workpiece bore to be honed, a movable shaft acting on said first named push rod to move the latter in the direction of honing element expansion, a tubular guide into which said shaft projects for axial and rotational movement therein, a hollow nut within said guide and into which said shaft is threaded, said nut having an arm projecting through a slot in said tubular guide whereby said nut is restrained against rotation, a gear case mounted on said tubular guide for axial movement thereon, said gear case having an internally threaded pinion therein, said guide having external threads to coact with said pinion threads so that when said pinion is rotated said gear case moves on said guide, and resilient means interposed between said gear case and said arm and adapted to exert pressure on said push rods and the honing elements and to compensate for variations in the initial tolerances of the bore to be honed.

4. In a honing machine, the combination comprising, a tubular spindle mounted for reciprocation and rotation, means connected to said spindle for reciprocating and rotating the latter, a push rod slidably mounted within said spindle and adapted to coact with a push rod in a honing tool to expand honing elements carried by the tool into engagement with a workpiece bore to be honed, a movable shaft acting on said first named push rod to move the latter in the direction of honing element expansion, a tubular guide into which said shaft projects for axial and rotational movement therein, a hollow nut within said guide and into which said shaft is threaded, said nut having an arm projecting through a slot in said tubular guide whereby said nut is restrained against rotation, a gear case mounted on said tubular guide for axial movement thereon, said gear case having an internally threaded pinion therein, said guide having external threads to coact with said pinion threads so that when said pinion is rotated said gear case moves on said guide, a reversibly driven honing element expansion shaft projecting into said gear case and drivingly connected to said pinion to turn the latter to move said gear case on said guide, and resilient means interposed between said gear case and said arm and adapted to exert pressure on said push rods and the honing elements and to compensate for variations in the initial tolerances of the bore to be honed.

5. In a honing machine, the combination comprising, a tubular spindle mounted for reciprocation and rotation, means connected to said spindle for reciprocating and rotating the latter, a push rod slidably mounted within said spindle and adapted to coact with a push rod in a honing tool to expand honing elements carried by the tool into engagement with a workpiece bore to be honed, a movable shaft acting on said first named push rod to move the latter in the direction of honing element expansion, a tubular guide into which said shaft projects for axial and rotational movement therein, a hollow nut within said guide and into which said shaft is threaded, said nut having an arm projecting through a slot in said tubular guide whereby said nut is restrained against rotation, a gear case mounted on said tubular guide for axial movement thereon, a plurality of springs interposed between said gear case and said arm and adapted to exert pressure on said push rods and the honing elements and to compensate for variations in the initial tolerances of the bore to be honed, and means supporting said springs from said gear case to limit the extent of their expansion.

6. In a honing machine, the combination comprising, a tubular spindle mounted for reciprocation and rotation, means connected to said spindle for reciprocating and rotating the latter, a push rod slidably mounted within said spindle and adapted to coact with a push rod in a honing tool to expand honing elements carried by the tool into engagement with a workpiece bore to be honed, a movable shaft acting on said first named push rod to move the latter in the direction of honing element expansion, a tubular guide into which said shaft projects for axial and rotational movement therein, a hollow nut within said guide and into which said shaft is threaded, said nut having an arm projecting through a slot in said tubular guide whereby said nut is restrained against rotation, a gear case mounted on said tubular guide for axial movement thereon, a plurality of springs interposed between said gear case and said arm and adapted to exert pressure on said push rods and the honing elements and to compensate for variations in the initial tolerances of the bore to be honed, and hanger means supporting said springs from said gear case to limit the extent of their expansion, said hanger means comprising a pair of rings circumscribing said tubular guide and having said arm therebetween, and a plurality of bolts supporting said rings from said gear case.

7. In a honing machine, the combination comprising, a tubular spindle mounted for reciprocation and rotation, means connected to said spindle for reciprocating and rotating the latter, a push rod slidably mounted within said spindle and adapted to coact with a push rod in a honing tool to expand honing elements carried by the tool into engagement with a workpiece bore to be honed, a movable shaft acting on said first named push rod to move the latter in the direction of honing element expansion, a tubular guide into which said shaft projects for axial and rotational movement therein, said guide being axially fixed relative to said spindle, a hollow nut within said guide and into which said shaft is threaded for axial movement relative to said guide and said spindle, said nut having an arm projecting through a slot in said tubular guide whereby said nut is restrained against rotation, a gear case mounted on said tubular guide for axial movement thereon, resilient means interposed between said gear case and said arm and adapted to exert pressure on said push rods and the honing elements and to compensate for variations in the initial tolerances of the bore to be honed, and drive means connected to said shaft for incrementally rotating the latter in said nut at the end of a honing cycle for compensating for honing element wear by resetting said shaft in said nut incrementally in the direction of honing element expansion.

8. In a honing machine, the combination comprising, a tubular spindle mounted for reciprocation and rotation, means connected to said spindle for reciprocating and rotating the latter, a push rod slidably mounted within said spindle and adapted to coact with a push rod in a honing tool to expand honing elements carried by the tool into engagement with a workpiece bore to be honed, a movable shaft acting on said first named push rod to move the latter in the direction of honing element expansion, a tubular guide into which said shaft projects for axial and rotational movement therein, said guide being axially fixed relative to said spindle, a hollow nut within said guide and into which said shaft is threaded for axial movement relative to said guide and said spindle, said nut having an arm projecting through a slot in said tubular guide whereby said nut is restrained against rotation, a gear case mounted on said tubular guide for axial movement thereon, and resilient means interposed between said gear case and said arm and adapted to exert pressure on said push rods and the honing elements and to compensate for variations in the initial tolerances of the bore to be honed, drive means connected to said shaft for incrementally rotating the latter in said nut at the end of a honing cycle for compensating for honing element wear by resetting said shaft in said nut incrementally in the direction of honing element expansion, and manual control means connected to rotate said shaft to the stone wear compensating movement of said shaft.

9. In a honing machine, the combination comprising, a powered drive shaft, a tubular tool spindle mounted for rotary and reciprocatory motion and adapted to have a honing tool connected thereto to be driven thereby, means connected to said spindle and said drive shaft for rotating said spindle, means connected to said spindle and said drive shaft for reciprocating said spindle, a push rod extending through said spindle and adapted to be moved in a first direction to expand the honing elements in the honing tool and in a second direction to permit retraction of the honing elements, a movable member acting on the upper end of said push rod and adapted to be moved in the stone expanding direction, a movable gear case, means including compression spring means connecting said gear case to said movable member, gearing housed in said gear case housing and adapted to be moved in a direction to move said movable member in the stone expanding direction, power means connected to said gearing and adapted to be operated in the stone expanding direction at the start of each honing cycle and in the opposite direction at the conclusion of each honing cycle, stone wear compensation gearing connected to said movable member and connected to be driven by said power means, and means controlling the operation of said stone wear compensation gearing at a selected time interval during operation of said power means in said opposite direction at the conclusion of a honing cycle.

10. In a honing machine, the combination comprising, a powered drive shaft, a tubular tool spindle mounted for rotary and reciprocatory motion and adapted to have a honing tool connected thereto to be driven thereby, means connected to said spindle and said drive shaft for rotating said spindle, means connected to said spindle and said drive shaft for reciprocating said spindle, a push rod extending through said spindle and adapted to be moved in a first direction to expand the honing elements in the honing tool, means biasing said push rod in a second direction to permit retraction of the honing elements, a movable member acting on the upper end of said push rod and adapted to be moved in the stone expanding direction, a movable gear case, means including compression spring means connecting said gear case to said movable member, gearing housed in said gear case housing and adapted to be moved in a direction to move said movable member in the stone expanding direction, power means connected to said gearing and adapted to be operated in the stone expanding direction at the start of each honing cycle and in the opposite direction at the conclusion of each honing cycle, stone wear compensation gearing connected to said movable member and connected to be driven by said power means, and means controlling the operation of said stone wear compensation gearing at a selected time interval during operation of said power means in said opposite direction at the conclusion of a honing cycle.

11. In a honing machine, the combination comprising, a powered drive shaft, a tubular tool spindle mounted for rotary and reciprocatory motion and adapted to have a honing tool connected thereto to be driven thereby, means connected to said spindle and said drive shaft for rotating said spindle, means connected to said spindle and said drive shaft for reciprocating said spindle, a push rod extending through said spindle and adapted to be moved in a first direction to expand the honing elements in the honing tool and in a second direction to permit retraction of the honing elements, a movable member connected to the upper end of said push rod and adapted to be moved in the stone expanding and retracting directions, a movable gear case, means including compression spring means connecting said gear case to said movable member, gearing housed in said gear case housing and adapted to be moved in a direction to move said movable member in the stone expanding direction, power means connected to said gearing and adapted to be operated in the stone expanding direction at the start of each honing cycle and in the opposite direction at the conclusion of each honing cycle, stone wear compensation gearing connected to said movable member and connected to be driven by said power means, and means controlling the operation of said stone wear compensation gearing at a selected time interval during operation of said power means in said opposite direction at the conclusion of a honing cycle.

12. In a honing machine, the combination comprising, a powered drive shaft, a tubular tool spindle mounted for rotary and reciprocatory motion and adapted to have a honing tool connected thereto to be driven thereby, means connected to said spindle and said drive shaft for rotating said spindle, means connected to said spindle and said drive shaft for reciprocating said spindle, a push rod extending through said spindle and adapted to be moved in a first direction to expand the honing elements in the honing tool and in a second direction to permit retraction of the honing elements, a movable member acting on the upper end of said push rod and adapted to be moved in the stone expanding direction, a movable gear case, means including a compression spring connecting said gear case to said movable member, gearing housed in said gear case housing and adapted to be moved in a direction to move said movable member in the stone expanding direction, power means connected to said gearing and adapted to be operated in the stone expanding direction at the start of each honing cycle and in the opposite direction at the conclusion of each honing cycle, stone wear compensation gearing connected to said movable member and connected to be driven by said power means, said last gearing including a threaded connection between said movable member and the gearing housed in said gear case housing and means controlling the operation of said stone wear compensation gearing at a selected time interval during operation of said power means in said opposite direction at the conclusion of a honing cycle.

13. In a honing machine, the combination comprising, a powered drive shaft, a tubular tool spindle mounted for rotary and reciprocatory motion and adapted to have a honing tool connected thereto to be driven thereby, means connected to said spindle and said drive shaft for rotating said spindle, means connected to said spindle and said drive shaft for reciprocating said spindle, a push rod extending through said spindle and adapted to be moved in a first direction to expand the honing elements in the honing tool and in a second direction to permit retraction of the honing elements, a movable member acting on the upper end of said push rod and adapted to be moved in the stone expanding direction, a movable gear case, means including a plurality of compression springs connecting said gear case to said movable member, said gear case housing gearing and adapted to be moved in a direction to move said movable member in the stone expanding direction, power means connected to said gearing and adapted to be operated in the stone expanding direction at the start of each honing cycle and in the opposite direction at the conclusion of each honing cycle, stone wear compensation gearing connected to said movable member and connected to be driven by said power means, and means controlling the operation of said stone wear compensation gearing at a selected time interval during operation of said power means in said opposite direction at the conclusion of a honing cycle.

14. In a honing machine, the combination comprising, a powered drive shaft, a tubular tool spindle mounted for rotary and reciprocatory motion and adapted to have a honing tool connected thereto to be driven thereby, means connected to said spindle and said drive shaft for rotating said spindle, means connected to said spindle and said drive shaft for reciprocating said spindle, a push rod extending through said spindle and adapted to be moved in a first direction to expand the honing elements in the honing tool and in a second direction to permit retraction of the honing elements, a movable member acting on the upper end of said push rod and adapted to be moved in the stone expanding direction, a movable gear case, means including compression spring means connecting said gear case to said movable member, gearing housed in said gear case housing and adapted to be moved in a direction to move said movable member in the stone expanding direction, power means connected to said gearing and adapted to be operated in the stone expanding direction at the start of each honing cycle and in the opposite direction at the conclusion of each honing cycle, stone wear compensation gearing connected to said movable member and connected to be driven by said power means, means controlling the operation of said stone wear compensation gearing at a selected time interval during operation of said power means in said opposite direction at the conclusion of a honing cycle, and manually operable means connected for operating said stone wear compensating gear to adjust the stone wear compensating movement of said movable member.

15. In a honing machine, the combination comprising, a machine frame having a vertical standard, a head casing mounted on said standard for vertical movement thereon, pneumatic means connected between said standard and said casing for moving said casing and holding it in a predetermined position, latch means adapted to lock said casing to said standard and operable in the event of pneumatic pressure failure, a main drive shaft having an end projecting from the top of said casing, an electric motor mounted on said standard and connected to said drive shaft to drive the latter, a tubular spindle mounted in said casing for reciprocation and rotation and having an end projecting from said casing to which a honing tool is adapted to be connected, means mounted within said casing and connected to said drive shaft and to said spindle to reciprocate and rotate the latter, a push rod slidably mounted within said spindle and adapted to coact with a push rod in the honing tool to expand honing elements carired by the tool into engagement with a workpiece bore to be honed, a shaft mounted for axial movement and for rotation and adapted to move said push rods in the honing element expanding direction, means connected to said shaft to move the latter axially in a first direction at the start of each honing cycle to expand the honing elements and in the opposite direction at the end of the honing cycle, and means connected to said shaft for incrementally rotating the latter at the end of each honing cycle to compensate for honing element wear by resetting said shaft incrementally in the direction of honing element expansion.

16. In a honing machine, the combination comprising, a machine frame having a vertical standard, a head casing mounted on said standard for vertical movement thereon, means connected between said standard and said casing for moving said casing and holding it in a predetermined position, a main drive shaft having an end projecting from the top of said casing, an electric motor mounted on said standard and connected to said drive shaft to drive the latter, a tubular spindle mounted in said casing for reciprocation and rotation and having an end projecting from said casing to which a honing tool is adapted to be connected, means mounted within said casing and connected to said drive shaft and to said spindle to reciprocate and rotate the latter, a push rod slidably mounted within said spindle and adapted to coact with a push rod in the honing tool to expand honing elements carried by the tool into engagement with a workpiece bore to be honed, a shaft mounted for axial movement and for rotation and adapted to move said push rods in the honing element expanding direction, threaded sleeve and gear means connected to said shaft to move the latter axially in a first direction at the start of each honing cycle to expand the honing elements and in the opposite direction at the end of the honing cycle, a threaded connection from said shaft to the sleeve of said sleeve and gear means, and means connected to said shaft for incrementally rotating the latter at the end of each honing cycle to cause said shaft to move axially of the sleve and compensate for honing element wear by resetting said shaft incrementally in the direction of honing element expansion.

17. In a honing machine, the combination comprising, a tubular spindle mounted for reciprocation and rotation, means connected to said spindle for reciprocating and rotating the latter, a push rod slidably mounted within said spindle and adapted to coact with a push rod in a honing tool to expand honing elements carried by the tool into engagement with a workpiece bore to be honed, movable means acting on said first named push rod to move the latter in the direction of honing element expansion, said movable means including resilient means to regulate the pressure exerted by said push rods and the honing elements and to compensate for variations in the initial tolerances of the bore to be honed, and including a variable plurality of compression springs arranged to have their individually exerted forces cumulative.

References Cited in the file of this patent

UNITED STATES PATENTS

| | | |
|---|---|---|
| 2,343,275 | Caldwell et al. | Mar. 7, 1944 |
| 2,377,310 | Caldwell et al. | June 5, 1945 |
| 2,780,893 | Seborg et al. | Feb. 12, 1957 |
| 2,791,871 | Johnson | May 14, 1957 |